(12) United States Patent
Matsushita et al.

(10) Patent No.: US 8,013,079 B2
(45) Date of Patent: Sep. 6, 2011

(54) CURABLE COMPOSITION

(75) Inventors: Noriko Matsushita, Takasago (JP); Hiroshi Iwakiri, Settsu (JP); Toshihiko Okamoto, Takasago (JP)

(73) Assignee: Kaneka Corporation, Osaka (JP)

( * ) Notice: Subject to any disclaimer, the term of this patent is extended or adjusted under 35 U.S.C. 154(b) by 159 days.

(21) Appl. No.: 12/088,797

(22) PCT Filed: Oct. 2, 2006

(86) PCT No.: PCT/JP2006/319726
§ 371 (c)(1),
(2), (4) Date: Sep. 23, 2009

(87) PCT Pub. No.: WO2007/037485
PCT Pub. Date: Apr. 5, 2007

(65) Prior Publication Data
US 2010/0036049 A1  Feb. 11, 2010

(30) Foreign Application Priority Data
Sep. 30, 2005 (JP) ................................. 2005-288797

(51) Int. Cl.
*C08F 283/00* (2006.01)
(52) U.S. Cl. .................. 525/477; 525/451; 156/326
(58) Field of Classification Search .................. 525/451, 525/477; 156/326
See application file for complete search history.

(56) References Cited

U.S. PATENT DOCUMENTS

| | | | | |
|---|---|---|---|---|
| 4,180,642 A * | 12/1979 | Takago | ............................ | 528/32 |
| 4,302,571 A * | 11/1981 | Arai et al. | ........................ | 528/32 |
| 4,358,613 A * | 11/1982 | Mark | ............................ | 564/238 |
| 4,395,526 A * | 7/1983 | White et al. | .................... | 528/18 |
| 4,417,042 A * | 11/1983 | Dziark | ............................ | 528/18 |
| 4,472,551 A * | 9/1984 | White et al. | .................. | 524/728 |
| 4,477,625 A * | 10/1984 | Lockhart | ....................... | 524/789 |
| 4,495,330 A * | 1/1985 | Chung et al. | .................... | 524/783 |
| 4,657,986 A * | 4/1987 | Isayama et al. | ............... | 525/407 |
| 4,814,368 A * | 3/1989 | Stein et al. | ..................... | 524/158 |
| 4,904,732 A | 2/1990 | Iwahara et al. | | |
| 4,977,228 A * | 12/1990 | Wakabayashi et al. | ......... | 528/12 |
| 5,296,582 A * | 3/1994 | Fujita et al. | ..................... | 528/27 |
| 5,464,888 A * | 11/1995 | Owen | ............................ | 524/104 |
| 5,541,266 A * | 7/1996 | Hasegawa et al. | ............. | 525/403 |
| 5,703,178 A * | 12/1997 | Gasmena | ....................... | 525/476 |
| 6,235,832 B1 * | 5/2001 | Deng et al. | ..................... | 524/525 |
| 6,410,640 B1 * | 6/2002 | Fukunaga et al. | ............. | 524/588 |
| 6,703,442 B1 * | 3/2004 | Ando et al. | ..................... | 524/588 |
| 6,737,482 B1 * | 5/2004 | Ando et al. | ..................... | 525/476 |
| 7,115,695 B2 | 10/2006 | Okamoto et al. | | |
| 2003/0153671 A1 * | 8/2003 | Kaszubski et al. | ............. | 524/492 |
| 2004/0074598 A1 * | 4/2004 | Ando et al. | ..................... | 156/325 |
| 2004/0198885 A1 * | 10/2004 | Okamoto et al. | ............. | 524/394 |
| 2005/0171315 A1 * | 8/2005 | Wakabayashi et al. | ......... | 528/26 |
| 2006/0111505 A1 | 5/2006 | Schindler et al. | | |
| 2007/0299214 A1 * | 12/2007 | Wakabayashi et al. | ....... | 525/451 |

FOREIGN PATENT DOCUMENTS

| | | |
|---|---|---|
| EP | 0 538 881 A2 | 4/1993 |
| JP | 52-73998 A | 6/1977 |
| JP | 63-6041 A | 1/1988 |
| JP | 02-102267 A | 4/1990 |
| JP | 2-102267 A | 4/1990 |
| JP | 2-102667 A | 4/1990 |
| JP | 5-39428 A | 2/1993 |
| JP | 5-117519 A | 5/1993 |
| JP | 6-271834 A | 9/1994 |
| JP | 9-12860 A | 1/1997 |
| JP | 9-100408 A | 4/1997 |
| JP | 11-193343 A | 7/1999 |
| JP | 2000-313814 A | 11/2000 |
| JP | 2000-345054 A | 12/2000 |
| JP | 2003-206410 A | 7/2003 |
| JP | 2004-83805 A | 3/2004 |
| JP | 2004-107398 A | 4/2004 |
| JP | 2005-248175 A | 9/2005 |
| JP | 2006-199730 A | 8/2006 |
| WO | 2004/022618 A1 | 3/2004 |

* cited by examiner

*Primary Examiner* — Robert Loewe
(74) *Attorney, Agent, or Firm* — Sughrue Mion, PLLC

(57) ABSTRACT

The present invention has its object to provide a curable composition which allows slight bleedout of a liquid compound to occur to the cured product and shows good curability and adhesiveness using a non-organotin catalyst, an amine compound, as a silanol condensation catalyst.

The present invention relates to a non-organotin-based curable composition which comprises:

(A) an organic polymer having a silicon-containing group capable of crosslinking by siloxane bond formation, and (B) a specific amidine compound and/or a guanidine compound having a melting point of not lower than 23° C., as a silanol condensation catalyst.

9 Claims, No Drawings

CURABLE COMPOSITION

CROSS REFERENCE TO RELATED APPLICATION

This application is a National Stage of International Application No. PCT/JP2006/319726 filed on Oct. 2, 2006, claiming priority based on Japanese Patent Application No. 2005-288797, filed Sep. 30, 2005, the contents of all of which are incorporated herein by reference in their entirety.

TECHNICAL FIELD

The present invention relates to a curable composition which comprises an organic polymer having a silicon-containing group (hereinafter referred also to as "a reactive silicon group" in some cases) which has a hydroxyl group or a hydrolysable group bonded to a silicon atom and is capable of crosslinking by siloxane bond formation.

BACKGROUND ART

It has been known that an organic polymer comprising at least one reactive silicon-containing group in one molecule has a property of crosslinking by siloxane bond formation accompanied with, for example, hydrolysis of a reactive silicon group due to water etc. at a room temperature and accordingly giving a rubber-like cured product.

With respect to the reactive silicon group-containing polymer, a polymer having a polyoxyalkylene main chain or a polyisobutylene main chain are disclosed in Patent Document 1, Patent Document 2 and the like and have already been produced industrially and used widely for uses as a sealant, an adhesive, paint and the like.

The curable composition comprising an organic polymer having a reactive silicon group is cured using a silanol condensation catalyst and, generally, an organotin catalyst having a carbon-tin bond, such as dibutyltin bis(acetylacetonate), is widely used. However, in recent years, issues have been raised concerning the toxic features of organotin compounds and, therefore, the development of non-organotin catalysts has been awaited. In Patent Document 3, Patent Document 4, Patent Document 5, Patent Document 6 and Patent Document 7, there are disclosed tin carboxylate salts and other metal carboxylates salts as silanol condensation catalysts and, further, it is disclosed that the addition of an amine compound as a cocatalyst or promoter results in improved curability. Further, from the environmental stress viewpoint, substantially metal-free curing catalysts are favorable and Patent Document 8 discloses that metal-free silanol condensation catalysts can be obtained by using an amine compound and a carboxylic acid in combination. However, the use of the non-organotin catalysts raises the problem that the adhesiveness tend to be inferior as compared with the use of organotin catalysts.

Patent Document 9 and Patent Document 10 disclose a technology of taking off the luster of the cured product surface or improving the antistaining properties of such surface by adding an amine compound having a melting point of 10 to 200° C. However, Patent Document 9 and Patent Document 10 describe such amine compound as a flatting agent or a stain resistance improving agent but does not describe the function of the same as a silanol condensation catalyst but describe, in the example section, organotin compounds as such catalysts. On the other hand, Patent Document 11 discloses a technology of attaining improvements in recovery and creep resistance by adding a guanidine compound to a curable composition comprising a polyoxyalkylene polymer having a reactive silicon group and a tetravalent tin-based curing catalyst but gives no description of the guanidine compound functioning as a silanol condensation catalyst.

Thus, in spite of the fact known in the art that such various physical properties as curability, stain resistance and recovery can be improved by adding an amine compound to a curable composition comprising a reactive silyl group-containing organic polymer, there are very few disclosures about a catalyst system in which an amine compound is used singly as a silanol condensation catalyst. Patent Document 12 discloses that an aryl group-substituted biguanide compound such as 1-(o-tolyl)biguanide, which is one species of amine compounds, acts as a silanol condensation catalyst. Patent Document 13 discloses that DBU (1,8-diazabicyclo[5.4.0]undec-7-ene), triethylamine and the like serve as silanol condensation catalysts.

The present inventors used guanidine compounds having an aryl group bound to a nitrogen atom thereof, such as the aryl-substituted biguanide compounds described in Patent Document 12, as silanol condensation catalysts for reactive silyl group-containing organic polymers and encountered a problem that such compounds sometimes show no sufficient catalytic activity. Further, when they used DBU (1,8-diazabicyclo[5.4.0]undec-7-ene), triethylamine and the like described in Patent Document 13 as silanol condensation catalysts, a problem arose, namely the cured product surface, when touched by the hand, stains the hand due to the movement of an amine compound-derived liquid compound to the cured product surface, that is bleeding out. Another problem encountered by them is that sometimes any practical curability or adhesiveness cannot be secured.

Patent Document 1: Japanese Kokai Publication Sho-52-73998
Patent Document 2: Japanese Kokai Publication Sho-63-6041
Patent Document 3: Japanese Kokai Publication Hei-5-39428
Patent Document 4: Japanese Kokai Publication Hei-9-12860
Patent Document 5: Japanese Kokai Publication 2000-313814
Patent Document 6: Japanese Kokai Publication 2000-345054
Patent Document 7: Japanese Kokai Publication 2003-206410
Patent Document 8: Japanese Kokai Publication Hei-5-117519
Patent Document 9: Japanese Kokai Publication Hei-9-100408
Patent Document 10: Japanese Kokai Publication Hei-11-193343
Patent Document 11: Japanese Kokai Publication 2004-83805
Patent Document 12: Japanese Kokai Publication 2005-248175
Patent Document 13: International Publication WO2004/022618

SUMMARY OF THE INVENTION

Accordingly, it is an object of the present invention to provide a curable composition comprising a reactive silyl group-containing organic polymer which allows slight bleed-out of a liquid compound to occur to the cured product surface and shows good curability and adhesiveness using an amine compound as a silanol condensation catalyst without using any highly toxic organotin catalyst.

The present inventors made intensive investigations to solve such problems and, as a result, found that when an amine compound having a specific structure and a melting point not lower than 23° C. is used as a silanol condensation catalyst for reactive silyl group-containing organic polymers, curable compositions which allows slight bleedout of a liquid compound to occur to the cured product surface and shows good curability and adhesiveness can be obtained in spite of its being a non-organotin catalyst. These findings have led to completion of the present invention.

Thus, the present invention relates to a non-organotin-based curable composition which comprises:
(A) an organic polymer having a silicon-containing group capable of crosslinking by siloxane bond formation,
(B) an amidine compound represented by the general formula (1):

(wherein $R^1$ is a hydrogen atom or a substituted or unsubstituted monovalent hydrocarbon group whose α-carbon to the nitrogen atom has single bonds alone (has no unsaturated bond), $R^2$ is a hydrogen atom or a substituted or unsubstituted monovalent hydrocarbon group and the two $R^3$ moieties each independently is a hydrogen atom or a monovalent organic group; any two or more of $R^1$, $R^2$ and the two $R^3$ moieties may be bound together to form a ring structure) and having a melting point of not lower than 23° C. and/or a guanidine compound represented by the general formula (2):

(wherein $R^4$, the two $R^5$ moieties and the two $R^6$ moieties each independently is a hydrogen atom or a non-aryl monovalent organic group and any two or more of $R^4$, the two $R^5$ moieties and the two $R^6$ moieties may be bound together to form a ring structure) and having a melting point of not lower than 23° C.

In a preferred mode of embodiment, the invention relates to
the non-organotin-based curable composition defined above
wherein the amidine compound is an amidine compound of the general formula (1) wherein any two or more of $R^1$, $R^2$ and the two $R^3$ moieties are bound together to form a ring structure.

In a more preferred mode of embodiment, the invention relates to
the non-organotin-based curable composition defined above
wherein the amidine compound of the general formula (1) is a cyclic amidine compound represented by the general formula (3):

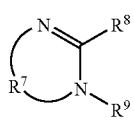

(wherein $R^7$ is a substituted or unsubstituted divalent hydrocarbon group whose α-carbon to each nitrogen atom has single bonds alone (has no unsaturated bond), $R^8$ is a hydrogen atom or a substituted or unsubstituted monovalent hydrocarbon group and $R^9$ each independently is a hydrogen atom or a monovalent organic group and $R^8$ and $R^9$ may be bound together to form a ring structure.)

In a preferred mode of embodiment, the invention relates to
the non-organotin-based curable composition defined above
wherein the guanidine compound represented by the general formula (2) is a biguanide compound represented by the general formula (4):

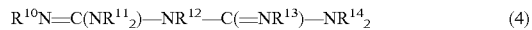

(wherein $R^{10}$, the two $R^{11}$ moieties, $R^{12}$, $R^{13}$ and the two $R^4$ moieties each independently is a hydrogen atom or a non-aryl monovalent organic group; any two or more of $R^{10}$, the two $R^{11}$ moieties, $R^{12}$, $R^{13}$ and the two $R^{14}$ moieties may be bound together to form a ring structure) and/or the general formula (5):

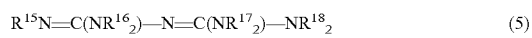

(wherein $R^{15}$, the two $R^{16}$ moieties, the two $R^{17}$ moieties, and the two $R^{18}$ moieties each independently is a hydrogen atom or a non-aryl monovalent organic group; any two or more of $R^{15}$, the two $R^{16}$ moieties, the two $R^{17}$ moieties and the two $R^{18}$ moieties may be bound together to form a ring structure).

In a further preferred mode of embodiment, the invention relates to
the non-organotin-based curable composition defined above
wherein the guanidine compound is a guanidine compound represented by the general formula (2) wherein any two or more of $R^4$, the two $R^5$ moieties and the two $R^6$ moieties are bound together to form a ring structure.

In a further preferred mode of embodiment, the invention relates to
the non-organotin-based curable composition defined above
wherein the guanidine compound represented by the general formula (2) is a cyclic guanidine compound represented by the general formula (6):

(wherein $R^9$ is a divalent organic group and the two $R^{20}$ moieties and $R^{21}$ each independently is a hydrogen atom or a non-aryl monovalent organic group; any two of the two $R^{20}$ moieties and $R^{21}$ may be bound together to form a ring structure).

In a further preferred mode of embodiment, the invention relates to
the non-organotin-based curable composition defined above
wherein the (A) component organic polymer comprises at least one polymer selected from the group consisting of polyoxyalkylene polymers, saturated hydrocarbon polymers and (meth)acrylate ester polymers.

In a further preferred mode of embodiment, the invention relates to
the non-organotin-based curable composition defined above
wherein the polyoxyalkylene polymer is a polyoxypropylene polymer.

In a further preferred mode of embodiment, the invention relates to
the non-organotin-based curable composition defined above wherein the main chain skeleton of the polyoxyalkylene polymer is composed of hydrogen atoms, carbon atoms and oxygen atoms alone.

In a further preferred mode of embodiment, the invention relates to the non-organotin-based curable composition defined above which comprises the component (B) in a proportion of 0.001 to 20 parts by weight per 100 parts by weight of the component (A).

In a further preferred mode of embodiment, the invention relates to the curable composition defined above which further comprises an adhesion promoter (C) in a proportion of 0.01 to 20 parts by weight per 100 parts by weight of the component (A).

A sealing composition or adhesive composition which comprises the above-mentioned curable composition may be mentioned as a preferred use of the non-organotin-based curable composition according to the invention.

DETAILED DESCRIPTION OF THE INVENTION

In the following, the present invention is described in detail.

The present invention relates to a non-organotin-based curable composition comprising a reactive silyl group-containing organic polymer and a specific silanol condensation catalyst. The term "non-organotin-based curable composition" as used herein refers to a curable composition comprising substantially no organotin compound.

The main chain skeleton of the reactive silyl group-containing organic polymer (A) to be used in the practice of the invention is not particularly restricted but may be any of various main chain skeletons. From the viewpoint of good compatibility with the component (B) and good curability and adhesiveness of the compositions obtained, however, the skeleton is preferably one containing hydrogen atoms and carbon atoms, optionally together with at least one hetero atom selected from among nitrogen atoms, oxygen atoms and sulfur atoms.

In particular, there may be mentioned polyoxyalkylene polymers such as polyoxyethylene, polyoxypropylene, polyoxybutylene, polyoxytetramethylene, polyoxyethylene-polyoxypropylene copolymer, and polyoxypropylene-poly-oxybutylene copolymer; hydrocarbon polymers such as ethylene-propylene copolymer, polyisobutylene, isobutylene-isoprene and the like copolymer, polychloroprene, polyisoprene, copolymer of isoprene or butadiene with acrylonitrile and/or styrene etc., polybutadiene, copolymer of isoprene or butadiene with acrylonitrile and styrene etc., and hydrogenated polyolefin copolymers obtained by hydrogenation of these polyolefin polymers; polyester polymers such as condensation polymers of dibasic acid such as adipic acid and glycol and ring-opening polymers of lactones; (meth) acrylic ester polymers obtained by radical polymerization of monomers such as ethyl(meth)acrylate and butyl(meth)acrylate etc.; vinyl polymers obtained by radical polymerization of monomers such as (meth) acrylic ester monomers, vinyl acetate, acrylonitrile and styrene etc.; graft polymers obtained by polymerization of vinyl monomers in the above-mentioned organic polymers; polysulfide polymers; polyamide polymers such as nylon 6 obtained by ring opening polymerization of ε-caprolactam, nylon 6,6 obtained by condensation polymerization of hexamethylenediamine and adipic acid, nylon 6,10 obtained by condensation polymerization of hexamethylenediamine and sebacic acid, nylon 11 obtained by condensation polymerization of s-aminoundecanoic acid, nylon 12 obtained by ring-opening polymerization of ε-aminolaurolactam, and copolymer nylon comprising two or more components of the monomer components composing the above-mentioned nylons; polycarbonates produced by condensation polymerization of bisphenol A and carbonyl chloride etc.; diallyl phthalate polymers; and the like.

Saturated hydrocarbon polymers such as polyisobutylene, hydrogenated polyisoprene, and hydrogenated polybutadiene, polyoxyalkylene polymers, and (meth) acrylic ester polymers are more preferable since they have relatively low glass transition temperature and give cured products excellent in cold resistance.

The glass transition temperature of the organic polymer as the component (A) is not particularly limited, however it is preferably 20° C. or lower, more preferably 0° C. or lower, and further preferably −20° C. or lower. If the glass transition temperature exceeds 20° C., the viscosity is higher in winter and in a cold area and the workability may be worsened in some cases and the cured product may be deteriorated in flexibility and elongation in some cases. The glass transition temperature is a value measured by DSC measurement based on the JIS K 7121.

Also, polyoxyalkylene polymers and (meth)acrylic ester polymers are preferable since they have high moisture permeability and give excellent deep part curability and adhesion in the case where they are used for a one package composition, polyoxyalkylene polymers are more preferable, and polyoxypropylene polymers are still more preferable. The polyoxyalkylene polymer is preferably one the main chain skeleton of which is composed of hydrogen atoms, carbon atoms and oxygen atoms alone.

In accordance with the invention, a reactive silyl group-containing organic polymer is used as the component (A) As compared with inorganic polymers whose main chain skeleton comprises polydimethylsiloxane or the like, the component (A), which is a constituent to be used in the practice of the invention, is better in compatibility with the component (B) and the curable composition obtained is excellent in curability and adhesiveness.

In the present invention, the reactive silicon group to be contained in the organic polymer is a group having a hydroxyl or hydrolysable group bonded to a silicon atom and capable of crosslinking by siloxane bond formation by reaction accelerated by a silanol condensation catalyst. The reactive silicon group may include a group represented by the general formula (7):

$$-SiR^{22}{}_{3-a}X_a \tag{7}$$

(wherein $R^{22}$ independently represents an alkyl group having 1 to 20 carbon atoms, an aryl group having 6 to 20 carbon atoms, an aralkyl group having 7 to 20 carbon atoms, or a triorganosiloxy group defined as —OSi(R')$_3$ (respective substituents R' are independently a substituted or unsubstituted hydrocarbon group having 1 to 20 carbon atoms); respective substituents X independently represent a hydroxyl or hydrolysable group; a denotes an integer of 1 to 3).

The hydrolysable group is not particularly limited and may include any conventionally known hydrolysable group. In particular, examples include a hydrogen atom, a halogen atom, an alkoxy, acyloxy, ketoxymate, amino, amido, acid amido, aminoxy, mercapto, alkenyloxy, and the like groups. Among them, a hydrogen atom, an alkoxy, acyloxy, keoxymate, amino, amido, aminoxy, mercapto, and alkenyloxy groups are preferable and in terms of moderate hydrolysability and handling easiness, an alkoxy group is particularly preferable.

One to three hydrolysable groups and hydroxyl groups may be bonded to one silicon atom. In the case where two or more hydrolysable groups and hydroxyl groups are bonded in the reactive silicon group, they may be same or different.

The character a in the above-mentioned general formula (7) denotes preferably 2 or 3, and more preferably 3, in terms of curability.

Specific examples of $R^{22}$ in the above-mentioned general formula (7) are alkyl groups such as methyl group and ethyl group; cycloalkyl groups such as cyclohexyl group; aryl groups such as phenyl group; aralkyl groups such as benzyl group; and triorganosiloxy groups defined as $—OSi(R')_3$. Among them, methyl group is particularly preferable.

Specific examples of the reactive silicon group include trimethoxysilyl group, triethoxysilyl group, triisopropoxysilyl group, dimethoxymethylsilyl group, diethoxymethylsilyl group, and diisopropoxymethylsilyl group.

Since high activity and good curability can be obtained, trimethoxysilyl group, triethoxysilyl group, and dimethoxymethylsilyl group are more preferable and trimethoxysilyl group is even more preferable. From a viewpoint of storage stability, dimethoxymethylsilyl group is particularly preferable. Triethoxysilyl group and diethoxymethylsilyl group are particularly preferable since the alcohol to be produced by hydrolysis of the reactive silicon group is ethanol and thus it is more safe.

Introduction of the reactive silicon group may be carried out by a conventionally known method. That is, the following methods may be employed.

(A) An organic polymer having an unsaturated group is obtained by causing reaction of an organic polymer having a functional group such as a hydroxyl group in a molecule with an organic compound having an active group reactive on the functional group and an unsaturated group. Alternatively, the organic polymer having an unsaturated group is obtained by copolymerization with an unsaturated group-containing epoxy compound. Successively, hydrosilylation is carried out by causing reaction of a reactive silicon group-containing hydrosilane on the obtained reaction product.

(B) A compound having a mercapto group and a reactive silicon group is reacted with the organic polymer having an unsaturated group obtained in the same manner as the method (A).

(C) An organic polymer having a functional group such as a hydroxyl group, an epoxy group, and an isocyanate group in a molecule is reacted with a compound having a functional group reactive on the functional group and a reactive silicon group.

The method described as the method (A) and the method of causing reaction of a polymer having a terminal hydroxyl group and a compound having an isocyanate group and a reactive silicon group in the method (C) are preferable among the above-exemplified methods since they are suitable of achieving high conversion efficiency in a relatively short reaction time. The organic polymer having a reactive silicon group obtained by the method (A) can give a curable composition with lower viscosity and better workability than the organic polymer obtained by the method (C) and the organic polymer obtained by the method (B) has strong odor due to the mercaptosilane and accordingly, the method (A) is particularly preferable.

Specific examples of the hydroxysilane compound to be used in the method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane and 1-[2-(trimethoxysilyl)ethyl]-1,1,3,3-tetramethyldisiloxane; acyloxysialnes such as methyldiacetoxysilane and phenyldiacetoxysilane; ketoximatosilanes such as bis(dimethylketoximato)methylsilane and bis(cyclohexylketoximato)methylsilane; and the like, but the examples thereof are not limited to them. Among them, halogenated silanes and alkoxysilanes are preferable and alkoxysilanes are particularly preferable since the curable composition to be obtained has moderate hydrolysability and is easy to handle. Among the alkoxysilanes, methyldimethylsilane is preferable since it is easily available and the curable composition comprising the organic polymer to be obtained therefrom is excellent in the curability, storage stability, elongation property, and tensile strength. Trimethoxysilane is particularly preferable in terms of good curability and recovery of the curable composition to be obtained therefrom.

As the synthesis method (B), there may be mentioned, for example, a method of introducing a compound having a mercapto group and a reactive silicon group into an unsaturated bond site of an organic compound by radical addition reaction in the presence of a radical initiator and/or a radical generation source, however it is not particularly limited. Specific examples of the compound having a mercapto group and a reactive silicon group include γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, mercaptomethyltriethoxysilane and the like, but are not limited to them.

A method for causing reaction of a polymer having a terminal hydroxyl group and a compound having an isocyanate group and a reactive silicon group as the synthesis method (C) may be, for example, the method disclosed in the Japanese Kokai Publication Hei-3-47825, however the method is not particularly limited. Specific examples of the compound having an isocyanate group and a reactive silicon group include γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, isocyanatomethyldiethoxymethylsilane and the like, but are not limited to them.

In the case of using a silane compound such as trimethoxysilane having three hydrolysable groups bonded to one silicon atom, disproportionation reaction is sometimes promoted. If the disproportionation reaction is promoted, an unstable compound such as dimethoxysilane is generated which is difficult to be managed. However in the case of using γ-mercaptopropyltrimethoxysilane or γ-isocyanatopropyltrimethoxysilane, such disproportionation reaction is not promoted. Therefore, the synthesis method (B) or (C) is preferably employed in the case where a group such as trimethoxysilyl having three hydrolysable groups bonded to one silicon atom is used as the silicon-containing group.

On the other hand, silane compounds represented by the general formula (8):

$$H—(SiR^{23}_2O)_m SiR^{23}_2—R^{24}—SiX_3 \quad (8)$$

(wherein X is as defined above, the $(2m+2)$ $R^{23}$ moieties each independently is a monovalent hydrocarbon group, preferably, from the availability and cost viewpoint, a monovalent hydrocarbon group containing 1 to 20 carbon atoms, more preferably a monovalent hydrocarbon group containing 1 to 8 carbon atoms, particularly preferably a monovalent hydrocarbon group containing 1 to 4 carbon atoms, $R^{24}$ is a divalent organic group, preferably, from the availability and cost viewpoint, a divalent hydrocarbon group containing 1 to 12 carbon atoms, more preferably a divalent hydrocarbon group containing 2 to 8 carbon atoms, particularly preferably a divalent hydrocarbon group containing 2 carbon atoms, and m is an integer of 0 to 19, preferably, from the availability and cost viewpoint, 1), do not undergo the disproportionation reaction. Therefore, in cases where a group consisting of a silicon atom and three hydrolysable groups bound thereto is to be introduced by the synthesizing method (A), the use of a silane compound represented by the general formula (8) is preferred. As specific examples of the silane compound represented by the general formula (8), there may be mentioned 1-[2-(trimethoxysilyl)ethyl]-1,1,3,3-tetramethyldisiloxane, 1-[2-(trimethoxysilyl)propyl]-1,1,3,3-tetramethyldisiloxane and 1-[2-(trimethoxysilyl)hexyl]-1,1,3,3-tetramethyldisiloxane.

The reactive silicon group-containing organic polymer may have a linear or branched structure and the polymer has a number average molecular weight on the basis of conversion into polystyrene by GPC in a range from 500 to 100,000, more preferably in a range from 1,000 to 50,000, and further preferably in a range from 3,000 to 30,000. If the number average molecular weight is lower than 500, the cured product tends to be undesirable in terms of the elongation property of the cured product and if it exceeds 100,000, the workability tends to become undesirable because of high viscosity. The procedure for determining the number average molecular weight is not particularly restricted, but the molecular weight can be measured as values on the polystyrene equivalent basis using, for example, the following:

Pumping system: Tosoh HLC-8120 GPC;
Column: Tosoh TSK-GEL H type;
Solvent: THF.

To obtain a rubber-like cured product with high strength, high elongation and low modulus of elasticity, the number of reactive silicon groups contained per one molecule of the organic polymer is at least one and more preferably 1.1 to 5 on average. If the number of reactive silicon groups contained in a molecule on average is lower than 1, the curability becomes insufficient and it becomes difficult to obtain good rubber elastic behavior. The reactive silicon group may be at either a terminus of the main chain or a terminus of a side chain of the organic polymer molecular chain or both. Particularly, in the case where the reactive silicon group exists only at a terminus of the main chain of the molecular chain, the effective mesh length of the organic polymer component contained in the cured product to be obtained finally is lengthened and it makes easy to obtain the rubber-like cured product having high strength, high elongation, and low modulus of elasticity.

The above-mentioned polyoxyalkylene polymer is substantially a polymer containing of a repeating unit represented by the general formula (9):

$$—R^{25}—O— \qquad (9)$$

(wherein $R^{25}$ represents a linear or branched alkylene group having 1 to 14 carbon atoms) and $R^{25}$ in the general formula (9) is a linear or branched alkylene group having preferably 1 to 14-carbon atoms and more preferably 2 to 4-carbon atoms. Further, in cases where the above-mentioned repeating unit of the polymer is an alkylene group composed of carbon atoms and hydrogen atoms alone, the polymer obtained, when used in a sealant composition, for instance, shows better adhesiveness as compared with the case of a fluorinated alkylene group, hence such alkylene group is more preferred. Specific examples of the repeating unit represented by the general formula (9) are as follows; —$CH_2O$—, —$CH_2CH_2O$—, —$CH_2CH(CH_3)$ O—, —$CH_2CH(CH_2CH_3)$ O—, —$CH_2C(CH_3)_2O$—, —$CH_2CH_2CH_2CH_2O$—, and the like. The main chain skeleton of the polyoxyalkylene polymer may contain only one kind of repeating unit or two or more kinds of repeating units. Particularly, in the case of using it for a sealant etc., a polymer containing a propylene oxide polymer as a main component is preferable since it is amorphous and has a relatively low viscosity.

A synthesis method of the polyoxyalkylene polymer may include, for example, a polymerization method using an alkaline catalyst such as KOH, a polymerization method using a transition metal compound-porphyrin complex catalyst obtained by causing reaction of an organic aluminum compound and porphyrin as described in Japanese Kokai Publication Sho-61-215623, a polymerization method using a composite metal cyanide complex catalyst disclosed in Japanese Kokoku Publication Sho-46-27250, Japanese Kokoku Publication Sho-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, and U.S. Pat. No. 3,427,335 etc., a polymerization method using a catalyst containing a polyphosphazene salt exemplified in Japanese Kokai Publication Hei-10-273512, and a polymerization method using a catalyst containing a phosphazene compound exemplified in Japanese Kokai Publication Hei-11-060722, however it is not limited to these examples.

A production method of a polyoxyalkylene polymer having a reactive silicon group may include those proposed in Japanese Kokoku Publication Sho-45-36319, Japanese Kokoku Publication Sho-46-12154, Japanese Kokai Publication Sho-50-156599, Japanese Kokai Publication Sho-54-6096, Japanese Kokai Publication sho-55-13767, Japanese Kokai Publication Sho-55-13468, Japanese Kokai Publication Sho-57-164123, Japanese Kokoku Publication Hei-3-2450, U.S. Pat. No. 3,632,557, U.S. Pat. No. 4,345,053, U.S. Pat. No. 4,366,307, and U.S. Pat. No. 4,960,844 etc., and also polyoxyalkylene polymers having a number average molecular weight of 6,000 or higher and a Mw/Mn ratio (weight average molecular weight/number average molecular weight) of 1.6 or lower and thus having high molecular weight and narrow molecular weight distribution as described in Japanese Kokai Publication Sho-61-197631, Japanese Kokai Publication Sho-61-215622, Japanese Kokai Publication Sho-61-215623, Japanese Kokai Publication Sho-61-218632, Japanese Kokai Publication Hei-3-72527, Japanese Kokai Publication Hei-3-47825, and Japanese Kokai Publication Hei-8-231707 can be exemplified, but not limited to these examples.

The above-mentioned polyoxyalkylene polymers having a reactive silicon group may be used each alone or two or more of them may be used in combination.

The above-mentioned saturated hydrocarbon polymer is a polymer substantially having no unsaturated carbon-carbon bond other than aromatic ring and the polymer forming its skeleton may be obtained by (1) polymerizing, as a main monomer, an olefin compound having 2 to 6 carbon atoms such as ethylene, propylene, 1-butene, and isobutylene or (2) homopolymerizing a diene compound such as butadiene and isoprene and/or copolymerizing the above-mentioned olefin compound and successively hydrogenating the homopolymer or copolymer. An isobutylene polymer and a hydrogenated polybutadiene polymer are preferable since they are easy to be introduced with a functional group into a terminus thereof and be controlled in the molecular weight, and they have possibility to have a large number of terminal functional groups, and an isobutylene polymer is particularly preferable.

Further, that the above-mentioned olefin compound or diene compound is a compound consisting of carbon atoms and hydrogen atoms alone is more preferred since the polymer obtained, when used in a sealant composition, for instance, shows better adhesiveness as compared with the case of a fluorinated olefin compound or fluorinated diene compound.

Those having a saturated hydrocarbon polymer as a main skeleton are excellent in heat resistance, weather resistance, durability and moisture-shutting property.

The isobutylene polymer may consist of solely isobutylene unit for all monomer units and may be a copolymer of isobutylene unit and another monomer, however in terms of the rubber property, the polymer is preferable to consist of 50% by weight or more, more preferable to consist of 80% by weight or more, and further preferable to consist of 90 to 99% by weight, of a repeating unit derived from isobutylene.

Various kinds of polymerization methods have been reported so far as a synthesis method of the saturated hydrocarbon polymer and particularly in recent years, so-called living polymerization has been developed. In the case of the saturated hydrocarbon polymer, particularly the isobutylene polymer, it is known that the polymer is easy to be produced by employing inifer polymerization (J. P. Kennedy et al., J. Polymer Sci., Polymer Chem. Ed. vol. 15, p. 2843 (1997)) discovered by Kennedy et al.; that polymerization can be carried out to give a molecular weight in a range from 500 to 100,000 with molecular weight distribution of 1.5 or narrower; and that various kinds of functional groups may be introduced into the molecule termini.

Examples of the production method of the saturated hydrocarbon polymer having a reactive silicon group may be, for example, the methods described in Japanese Kokoku Publication Hei-4-69659, Japanese Kokoku Publication Hei-7-108928, Japanese Kokai Publication Sho-63-254149, Japanese Kokai Publication Sho-64-22904, Japanese Kokai Publication Hei-1-197509, Patent pamphlet No. 2,539,445 and Patent pamphlet No. 2,873,395, and Japanese Kokai Publication Hei-7-53882, however the method is not limited to these exemplified methods.

The above-mentioned saturated hydrocarbon polymer having a reactive silicon group may be used alone or two or more kinds of the polymer may be used in combination.

A (meth)acrylic ester monomer composing the main chain of the above-mentioned (meth)acrylic ester polymer is not particularly limited and various kinds of monomers may be used. Examples include (meth)acrylic acid monomers such as (meth)acrylic acid, methyl(meth)acrylate, ethyl (meth)acrylate, n-propyl(meth)acrylate, isopropyl (meth)acrylate, n-butyl(meth)acrylate, isobutyl (meth)acrylate, tert-butyl(meth) acrylate, n-pentyl (meth)acrylate, n-hexyl(meth)acrylate, cyclohexyl (meth)acrylate, n-heptyl(meth)acrylate, n-octyl (meth)acrylate, 2-ethylhexyl(meth)acrylate, nonyl (meth) acrylate, decyl(meth)acrylate, dodecyl(meth)acrylate, phenyl(meth)acrylate, tolyl(meth)acrylate, benzyl (meth)acrylate, 2-methoxyethyl(meth)acrylate, 3-methoxybutyl(meth) acrylate, 2-hydroxyethyl(meth)acrylate, 2-hydroxypropyl (meth)acrylate, stearyl(meth)acrylate, glycidyl(meth) acrylate, 2-aminoethyl(meth)acrylate, γ-(methacryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, (meth)acrylic acid ethylene oxide adduct and the like. With respect to the (meth) acrylic ester polymer, the following vinyl monomers can be copolymerized together with a (meth) acrylic ester monomer.

Examples of the vinyl monomer are styrene monomers such as styrene, vinyltoluene, α-methylstyrene, chlorostyrene, styrenesulfonic acid and its salts; silicon-containing vinyl monomers such as vinyltrimethoxysilane and vinyltriethoxysilane; maleic anhydride, maleic acid, and monoalkyl and dialkyl esters of maleic acid; fumaric acid, and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, ally chloride, and allyl alcohol; and the like. They may be used alone or a plurality of them may be copolymerized. Among them, in terms of the physical properties of a produced material, and the like, polymers comprising a styrene monomer and a (meth)acrylic acid monomer are preferable. (Meth)acrylic polymers comprising an acrylic ester monomer and a methacrylic ester monomer are more preferable and acrylic polymers comprising an acrylic ester monomer are further preferable. In the case of use for general construction and the like, since physical properties such as low viscosity of a mixture and low modulus, high elongation, weather resistance, and heat resistant of the cured product, and the like are required, a butyl acrylate monomer is more preferable. On the other hand, in the case of use for an automobile and the like for which oil-proofness etc. is required, an ethyl acrylate-based copolymer is more preferable. Since the polymer comprising mainly ethyl acrylate tends to be slightly inferior in low temperature properties (e.g. cold resistance) although having excellent oil-proofness, in order to improve the low temperature properties, a portion of ethyl acrylate may be replaced with butyl acrylate. However since the good oil-proofness is lowered as the ratio of butyl acrylate is increased, the ratio is preferably suppressed to 40 mol % or lower and more preferably to 30 mol % or lower for use requiring the oil-proofness. Also, to improve the low temperature properties and the like without deterioration of the oil-proofness, 2-methoxyethyl acrylate, 2-ethoxyethyl acrylate and the like in which oxygen is introduced in an alkyl group in the side chain is preferably used. However, since introduction of an alkoxy group having an ether bond in the side chain tends to lower the heat resistance, the ratio is preferably adjusted to 40 mol % or lower when heat resistance is needed. In accordance with the various uses and required aims, the required physical properties such as the oil-proofness, heat resistance, and low temperature properties should be considered and consequently, it is possible to adjust the ratio and obtain suitable polymers. For example, although it is not particularly limited, ethyl acrylate/butyl acrylate/2-methoxyethyl acrylate copolymer [(40 to 50)/(20 to 30)/(30 to 20) ratio by mole] can be exemplified as a polymer with good balance of the physical properties such as the oil-proofness, heat resistance, and low temperature properties.

In this invention, these preferable monomers may be copolymerized with other monomers and also block-copolymerized with them and in that case, these preferable monomers are preferably contained at a ratio of 40% by weight or higher. In the above descriptions, (meth) acrylic acid means acrylic acid and/or methacrylic acid.

A synthesis method of a (meth)acrylic ester polymer is not particularly limited and a conventionally known method may be employed. However, a polymer obtained by a common free radical polymerization method using an azo compound, a peroxide or the like as a polymerization initiator has a problem that the molecular weight distribution value is generally as high as 2 or higher and the viscosity is thus high. Accordingly, to obtain a (meth) acrylic ester polymer having a crosslinkable functional group at a terminus of molecular chain at a high ratio, and with narrow molecular weight distribution and low viscosity, a living radical polymerization method is preferably employed.

Among "living radical polymerization method", "atom transfer radical polymerization method" for polymerizing a (meth)acrylic ester monomer using an organic halide, a halogenated sulfonyl compound or the like as an initiator and a transition metal complex as a catalyst has, in addition to the characteristics of the above-mentioned "living radical polymerization methods", a wide range of the option of the initiator and the catalyst since a halogen etc. which is relatively advantageous for the functional group conversion reaction, and is therefore further preferable as a production method of the (meth)acrylic ester polymer having a specified functional group. Examples of the atom transfer radical polymerization method are, for example, the method described in Matyjaszewski et al., J. Am. Chem. Soc., vol. 117, p. 5614 (1995).

Examples of a production method of the (meth)acrylic ester polymer having a reactive silicon group are, for example, production methods employing free radical polymerization methods using chain transfer agents and described in Japanese Kokoku Publication Hei-3-14068, Japanese Kokoku Publication Hei-4-55444, Japanese Kokai Publication Hei-6-211922, and the like. Also, a production method employing an atom transfer radical polymerization method is disclosed in Japanese Kokai Publication Hei-9-272714 and the like, however the method is not limited to these exemplified methods.

The above-mentioned (meth) acrylic ester polymers having a reactive silicon group may be used alone or two or more kinds of them may be used in combination.

These organic polymers having a reactive silicon group may be used alone or two or more of them may be used in combination. Practically, organic polymers obtained by blending two or more kinds of polymers selected from the group consisting of polyoxyalkylene polymers having a reactive silicon group, saturated hydrocarbon polymers having a reactive silicon group, and (meth)acrylic ester polymers having a reactive silicon group may also be used.

Production methods of organic polymers by blending a polyoxyalkylene polymer having a reactive silicon group and a (meth) acrylic ester polymer having a reactive silicon group are proposed in Japanese Kokai Publication Sho-59-122541, Japanese Kokai Publication Sho-63-112642, Japanese Kokai Publication Hei-6-172631, Japanese Kokai Publication Hei-11-16763 and the like, however the production method is not limited to these exemplified methods. A preferred specific example is a production method involving blending a polyoxyalkylene polymer having a reactive silicon group with a copolymer having a reactive silicon group and a molecular chain substantially comprising a (meth) acrylic ester monomer unit having an alkyl group of 1 to 8 carbon atoms and represented by the following general formula (10):

(wherein $R^{26}$ represents a hydrogen atom or a methyl group; and $R^{27}$ denotes an alkyl group having 1 to 8 carbon atoms) and a (meth)acrylic ester monomer unit having an alkyl group of 10 or more carbon atoms and represented by the following general formula (11):

(wherein $R^{26}$ represents the same as defined above; and $R^{28}$ denotes an alkyl group having 10 or more carbon atoms).

Examples of $R^{27}$ in the above-mentioned formula (10) are alkyl groups having 1 to 8, preferably 1 to 4, and more preferably 1 or 2 carbon atoms such as methyl group, ethyl group, propyl group, n-butyl group, tert-butyl group, 2-ethylhexyl group and the like. Only one single species of the alkyl group $R^{27}$ may be contained in the whole composition or two or more different groups may be contained therein.

Examples of $R^{28}$ in the above-mentioned formula (11) are long chain alkyl groups having 10 or more, generally 10 to 30, and preferably 10 to 20 carbon atoms such as lauryl group, tridecyl group, cetyl group, stearyl group, behenyl group and the like. Same as the case of $R^{27}$, only one single species of the alkyl group $R^{28}$ may be contained in the whole composition or two or more different groups may be contained therein.

The molecular chain of the (meth)acrylic ester polymer substantially comprises the monomer units represented by the general formulae (10) and (11) and "substantially" here means the weight of the total of the monomer units represented by the general formulae (10) and (11) contained in the copolymer exceeds 50% by weight relative to the sum of the weight of the polymer. The total of the monomer units represented by the general formulae (10) and (11) is preferably 70% by weight or more.

The ratio of the monomer unit represented by the general formula (10) and the monomer unit represented by the general formula (11) is preferably from (95:5) to (40:60) and more preferably (90:10) to (60:40) on the basis of weight.

The monomer units which may be contained in the copolymer, other than those represented by the general formulae (10) and (11), may include acrylic acid such as acrylic acid and methacrylic acid; amido group-containing monomers such as acrylamide, methacrylamide, N-methylolacrylamide, and N-methylolmethacrylamide, epoxy group-containing monomers such as glycidyl acrylate and glycidyl methacrylate, and amino group-containing monomers such as diethylaminoethyl acrylate, diethylaminoethyl methacrylate, and aminoethyl vinyl ether; and monomer units derived from acrylonitrile, styrene, α-methylstyrene, alkyl vinyl ether, vinyl chloride, vinyl acetate, vinyl propionate, and ethylene.

The organic polymer obtained by blending the saturated hydrocarbon polymer having a reactive silicon group and the (meth) acrylic ester copolymer having a reactive silicon group may include those proposed in Japanese Kokai Publication Hei-1-168764, Japanese Kokai Publication 2000-186176 and the like, however it is not limited to these exemplified polymers.

Further, a production method of the organic polymer obtained by blending the (meth) acrylic ester copolymer having a reactive silicon functional group may also include a method of polymerizing a (meth) acrylic ester monomer in the presence of an organic polymer having a reactive silicon group. The methods are practically disclosed in Japanese Kokai Publication Sho-59-78223, Japanese Kokai Publication Sho-59-168014, Japanese Kokai Publication Sho-60-228516, Japanese Kokai Publication Sho-60-228517 and the like, however the method is not particularly limited to these exemplified methods.

On the other hand, the main chain skeleton of the organic polymer may contain another component such as an urethane bond component in an extent that the effect of the invention is not so significantly adversely affected.

The above-mentioned urethane bond component is not particularly limited and may include a group (hereinafter, referred to as an amido segment in some cases) produced by reaction of an isocyanate group and an active hydrogen group.

The amido segment is a group represented by the general formula (12):

(wherein $R^{29}$ denotes a hydrogen atom or a substituted or unsubstituted monovalent organic group).

The above-mentioned amido segment may specifically include an urethane group produced by reaction of an isocyanate group and a hydroxyl group; an urea group produced by reaction of an isocyanate group and an amino group; a thiourethane group produced by reaction of an isocyanate group and a mercapto group; and the like. Also, in the invention, groups produced by reaction of an active hydrogen in the above-mentioned urethane group, urea group, and thiourea group further with an isocyanate group are also included as the group represented by the general formula (12).

An industrial method for easily producing the organic polymer having the amido segment and a reactive silicon group may include, for example, a method for producing the organic polymer by causing reaction of an excess amount of a polyisocyanate compound with an organic polymer having an active hydrogen-containing group at a terminus for obtaining a polymer having an isocyanate group at the terminus of a polyurethane type main chain and either successively or simultaneously causing reaction of the W-group of a silicon compound represented by the general formula (13) with all or a portion of the isocyanate group:

(wherein $R^{22}$, X, and a are the same as described above; $R^{30}$ denotes a divalent organic group and more preferably a substituted or unsubstituted divalent hydrocarbon group having 1 to 20 carbon atoms; W denotes an active hydrogen-containing group selected from a hydroxyl, carboxyl, mercapto, and (primary or secondary) amino groups). Conventionally known production methods of the organic polymer relevant to the above-mentioned production method are exemplified in Japanese Kokoku Publication Sho-46-12154 (U.S. Pat. No. 3,632,557), Japanese Kokai Publication Sho-58-109529 (U.S. Pat. No. 4,374,237), Japanese Kokai Publication Sho-62-13430 (U.S. Pat. No. 4,645,816), Japanese Kokai Publication Hei-8-53528 (EPO Patent No. 0676403), Japanese Kokai Publication Hei-10-204144 (EPO Patent No. 0831108), Japanese Kohyo Publication 2003-508561 (U.S. Pat. No. 6,197,912), Japanese Kokai Publication Hei-6-211879 (U.S. Pat. No. 5,364,955), Japanese Kokai Publication Hei-10-53637 (U.S. Pat. No. 5,756,751), Japanese Kokai Publication Hei-11-100427, Japanese Kokai Publication 2000-169544, Japanese Kokai Publication 2000-169545, Japanese Kokai Publication 2002-212415, Japanese Patent No. 3,313,360, U.S. Pat. No. 4,067,844, U.S. Pat. No. 3,711,445, Japanese Kokai Publication 2001-323040, and the like.

The divalent organic group represented by $R^{30}$ is not particularly restricted but may be a saturated or unsaturated divalent hydrocarbon group consisting of a hydrogen atom and a carbon atom or a divalent hydrocarbon having a substituent containing at least one hetero atom selected from among a nitrogen atom, an oxygen atom, a phosphorus atom and a sulfur atom.

Also, the method may include a method for producing the organic polymer by causing reaction of a reactive silicon group-containing isocyanate compound represented by the general formula (14) with an organic polymer having an active hydrogen-containing group at a terminus:

(wherein $R^{22}$, $R^{30}$, X, and a are the same as described above). Conventionally known production methods of the organic polymer relevant to the above-mentioned production method are exemplified in Japanese Kokai Publication Hei-11-279249 (U.S. Pat. No. 5,990,257), Japanese Kokai Publication 2000-119365 (U.S. Pat. No. 6,046,270), Japanese Kokai Publication Sho-58-29818 (U.S. Pat. No. 4,345,053), Japanese Kokai Publication Hei-3-47825 (U.S. Pat. No. 5,068,304), Japanese Kokai Publication Hei-11-60724, Japanese Kokai Publication 2002-155145, Japanese Kokai Publication 2002-249538, Wo 03/018658, WO 03/059981, and the like.

The organic polymer having an active hydrogen-containing group at a terminus may include oxyalkylene polymers having a hydroxyl group at a terminus (e.g. polyether polyols), polyacrylic polyols, polyester polyols, saturated hydrocarbon polymers having a hydroxyl group at a terminus (e.g. polyolefin polyols), polythiols compounds, polyamine compounds and the like. Among them, polyether polyols, polyacrylic polyols, and polyolefin polyols are preferable since the glass transition temperature of the organic polymers to be obtained is relatively low and cured products to be obtained are excellent in cold resistance. Particularly, polyether polyols are more preferable since the organic polymers to be obtained have low viscosity, good workability and excellent deep part curability and adhesion. Polyacrylic polyols and saturated hydrocarbon polymers are further preferable since cured products derived from the organic polymers to be obtained are excellent in weather resistance and heat resistance.

The polyether polyols to be used may be those which are produced by any production method, however the polyether polyols preferably have at least 0.7 hydroxyl groups per molecular terminus on average of all molecules. Practically, oxyalkylene polymers produced by using a conventional alkali metal catalyst; and oxyalkylene polymers produced by causing reaction of alkylene oxides with an initiator such as polyhydroxy compounds having at least two hydroxyl groups in the presence of a composite metal-cyanide complex or cesium can be exemplified, for example.

Among the above-mentioned polymerization methods, the polymerization method using a composite metal-cyanide complex is preferable since oxyalkylene polymers with low un-saturation degree, narrow Mw/Mn (weight average molecular weight/number average molecular weight), low viscosity, high acid resistance, and high weather resistance can be obtained.

Examples of the above-mentioned polyacrylic polyols are polyols having a (meth) acrylic acid alkyl ester (co)polymer as a skeleton and containing a hydroxyl group in a molecule. A synthesis method of the polymers is preferably a living radical polymerization method and more preferably an atom transfer radical polymerization method since they give narrow molecular weight distribution and low viscosity. Also, a polymer obtained by so-called SGO process, that is a polymer obtained by continuous bulk polymerization of an acrylic alkyl ester monomer at high temperature and high pressure as described in Japanese Kokai Publication 2001-207157 is preferably used. More practically, UH-2000 manufactured by Toagosei Co., Ltd. can be exemplified, for example.

Specific examples of the above-mentioned polyisocyanate compound may include aromatic polyisocyanates such as toluene (tolylene) diisocyanate, diphenylmethane diisocyanate, and xylylene diisocyanate; aliphatic polyisocyanates such as isophorone diisocyanate and hexamethylene diisocyanate; and the like.

The silicon compound represented by the general formula (13) is not particularly limited and specific examples thereof are amino group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy group-containing silanes such as γ-hydroxypropyltrimethoxysilane; mercapto group-containing silanes such as γ-mercaptopropyltrimethoxysilane; and the like. Also, as described in Japanese Kokai Publication Hei-6-211879 (U.S. Pat. No. 5,364,956), Japanese Kokai Publication Hei-10-53637 (U.S. Pat. No. 5,756,751), Japanese Kokai Publication Hei-10-204144 (EPO Patent No. 0831108), Japanese Kokai Publication 2000-169544, and Japanese Kokai Publication 2000-169545, Michael adducts of various kinds of α,β-unsaturated carbonyl compounds and primary amino group-containing silanes or Michael adducts of various kinds of (meth)acryloyl group-containing silanes and primary amino group-containing compounds are usable as the silicon compound represented by the general formula (13).

The reactive silicon group-containing isocyanate compound represented by the general formula (14) is not particularly limited and specific examples thereof are γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate, diethoxymethylsilylmethyl isocyanate and the like. Also, as described in Japanese Kokai Publication 2000-119365 (U.S. Pat. No. 6,046,270), compounds obtained by reaction of silicon compounds represented by the general formula (13) and excess amounts of the above-mentioned polyisocyanate compounds are usable as the reactive silicon group-containing isocyanate compound represented by the general formula (14).

In the present invention, an amidine compound represented by the general formula (1) and having a melting point of not lower than 23° C. and/or a guanidine compound represented by the general formula (2) and having a melting point of not lower than 23° C. are used as a silanol condensation catalyst (B). (Hereinafter, the "amidine compound and/or guanidine compound" is sometimes referred to as "amine compound (B)" for short.) When the amine compound (B) placed under the conditions of ordinary pressure (0.1013 MPa) and 23° C. is macroscopically found to be a solid, the melting point of the amine compound (B) can be judged to be not lower than 23° C.

$$R^1N\!=\!CR^2\!-\!NR^3{}_2 \quad (1)$$

(wherein $R^1$ is a hydrogen atom or a substituted or unsubstituted monovalent hydrocarbon group whose 1-carbon to the nitrogen atom has single bonds alone (has no unsaturated bond), $R^2$ is a hydrogen atom or a substituted or unsubstituted monovalent hydrocarbon group and the two $R^3$ moieties each independently is a hydrogen atom or a monovalent organic group; any two or more of $R^1$, $R^2$ and the two $R^3$ moieties may be bound together to form a ring structure)

$$R^4N\!=\!C(NR^5{}_2)\!-\!NR^6{}_2 \quad (2)$$

(wherein $R^4$, the two $R^5$ moieties and the two $R^6$ moieties each independently is a hydrogen atom or a non-aryl monovalent organic group and any two or more of $R^4$, the two $R^5$ moieties and the two $R^6$ moieties may be bound together to form a ring structure)

These amine compounds (B) function as the so-called silanol condensation catalyst which can cause siloxane bond formation from the hydroxyl groups or hydrolysable groups bound to silicon atoms contained in the (A) component organic polymer. While organotin compounds such as dibutyltin dilaurate and dibutyltin diacetylacetonate are used in the prior art as silanol condensation catalysts for the component (A), namely reactive silyl group-containing organic polymer, the use of the amine compound (B) according to the invention can give curable compositions having practical curability in spite of its being a non-organotin catalyst. When an amine compound having a melting point lower than 23° C., a liquid matter tends to bleed out onto the cured product surface and the adhesiveness also tends to be poor. On the contrary, when the amine compound (B) is used in accordance with the invention, curable compositions allowing no bleedout to occur and showing good adhesiveness can be obtained. The liquid matter causing bleedout on the cured product surface presumably comprises a compound(s) derived from the amine compound(s) used.

For imparting good curability, it is essential that $R^1$ in the general formula (1) be a hydrogen atom or a substituted or unsubstituted monovalent hydrocarbon group whose α-carbon to the nitrogen atom has single bonds alone (has no unsaturated bond). $R^1$ is not particularly restricted provided that the α-carbon to the nitrogen atom has single bonds alone; thus, it may be a saturated or unsaturated monovalent hydrocarbon group composed of hydrogen atoms and carbon atoms or a monovalent hydrocarbon group having a substituent(s) containing at least one hetero atom selected from among a nitrogen atom, an oxygen atom, a phosphorus atom and a sulfur atom. From the viewpoints of availability or curability, $R^1$ is preferably a hydrogen atom or a substituted or unsubstituted monovalent hydrocarbon group containing 1 to 20 carbon atoms whose α-carbon to the nitrogen atom has single bonds alone, and more preferably a substituted or unsubstituted monovalent hydrocarbon group containing 1 to 10 carbon atoms whose α-carbon to the nitrogen atom has single bonds alone.

$R^2$ in the general formula (1) is a hydrogen atom or a substituted or unsubstituted monovalent hydrocarbon group.

The hydrocarbon group is not particularly restricted; thus, it may be a saturated or unsaturated monovalent hydrocarbon group composed of hydrogen atoms and carbon atoms or a monovalent hydrocarbon group having a substituent(s) containing at least one hetero atom selected from among a nitrogen atom, an oxygen atom, a phosphorus atom and a sulfur atom. From the viewpoints of availability or curability, $R^2$ is preferably a hydrogen atom or a substituted or unsubstituted monovalent hydrocarbon group containing 1 to 20 carbon atoms, and more preferably a hydrogen atom or a substituted or unsubstituted monovalent hydrocarbon group containing 1 to 10 carbon atoms.

In the general formula (1), the two $R^3$ moieties each is a hydrogen atom or a monovalent organic group. In cases where $R^3$ is a monovalent organic group, each organic group is not particularly restricted but may be a saturated or unsaturated monovalent hydrocarbon group consisting of a hydrogen atom and a carbon atom alone or a monovalent hydrocarbon group having a substituent(s) containing at least one hetero atom selected from among a nitrogen atom, an oxygen atom, a phosphorus atom and sulfur atoms. Further, $R^3$ each may be a functional group such as an amino group or imino group. From the availability and curability viewpoint, the two $R^3$ moieties each is preferably a hydrogen atom or a substituted or unsubstituted monovalent hydrocarbon group containing 1 to 20 carbon atoms, more preferably a hydrogen atom or a substituted or unsubstituted monovalent hydrocarbon group containing 1 to 10 carbon atoms.

Since high activity and good curability can be obtained, preferred as the amidine compound represented by the general formula (1) are those amidine compounds of general formula (1) wherein any two or more of $R^1$, $R^2$ and the two $R^3$ moieties are bound together to form a ring structure, and particularly preferred are cyclic amidine compounds represented by the general formula (3):

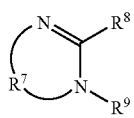
(3)

(wherein $R^7$ is a substituted or unsubstituted divalent hydrocarbon group whose α-carbon to the nitrogen atom has single bonds alone (has no unsaturated bond), $R^8$ is a hydrogen atom or a substituted or unsubstituted monovalent hydrocarbon group, $R^9$ each independently is a hydrogen atom or a monovalent organic group and $R^8$ and $R^9$ may be bound together to form a ring structure.)

From the viewpoints of availability and curability, $R^7$ in the general formula (3) is preferably a substituted or unsubstituted divalent hydrocarbon group containing 1 to 10 carbon atoms whose α-carbon to the nitrogen atom has single bonds alone (has no unsaturated bond), more preferably a substituted or unsubstituted divalent hydrocarbon group containing 1 to 5 carbon atoms whose α-carbon to the nitrogen atom has single bonds alone, and particularly preferably a substituted or unsubstituted divalent hydrocarbon group containing 2 or 3 carbon atoms whose α-carbon to the nitrogen atom has single bonds alone. From the viewpoints of availability and curability, $R^8$ and $R^9$ each is preferably a hydrogen atom or a substituted or unsubstituted monovalent hydrocarbon group containing 1 to 20 carbon atoms, and more preferably a hydrogen atom or a substituted or unsubstituted monovalent hydrocarbon group containing 1 to 10 carbon atoms.

In the general formula (2), $R^4$, the two $R^5$ moieties and the two $R^6$ moieties each independently is a hydrogen atom or a non-aryl monovalent organic group. In cases where any of $R^4$, the two $R^5$ moieties and the two $R^6$ moieties in the general formula (2) is a monovalent organic group, each organic group is not particularly restricted but may be a saturated or unsaturated monovalent hydrocarbon group consisting of a hydrogen atom and a carbon atom alone or a monovalent hydrocarbon group having a substituent(s) containing at least one hetero atom selected from among a nitrogen atom, an oxygen atom, a phosphorus atom and sulfur atoms. Further, $R^4$, the two $R^5$ moieties and the two $R^6$ moieties each may be a functional group such as an amino group or imino group. From the availability and curability viewpoint, $R^4$, the two $R^5$ moieties and the two $R^6$ moieties each is preferably a hydrogen atom or a substituted or unsubstituted monovalent hydrocarbon group containing 1 to 20 carbon atoms, and more preferably a hydrogen atom or a substituted or unsubstituted monovalent hydrocarbon group containing 1 to 10 carbon atoms. Since, however, the curability decreases as the number of aryl groups increases, it is essential that $R^4$, the two $R^5$ moieties and the two $R^6$ moieties each independently be a hydrogen atom or a non-aryl monovalent organic group.

From the adhesiveness and bleedout viewpoint, the guanidine compound represented by the general formula (2) preferably comprises a biguanide compound represented by the general formula (4) and/or a biguanide compound represented by the general formula (5). The term "biguanide compound" as used herein refers to a compound having the skeleton of the general formula (4) or general formula (5).

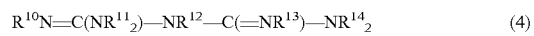
(4)

(In the above formula, $R^{10}$, the two $R^{11}$ moieties, $R^{12}$, $R^{13}$ and the two $R^{14}$ moieties each independently is a hydrogen atom or a non-aryl monovalent organic group. Any two or more of $R^{10}$, the two $R^{11}$ moieties, $R^{12}$, $R^{13}$ and the two $R^{14}$ moieties may be bound together to form a ring structure.)

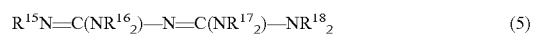
(5)

(In the above formula, $R^{15}$, the two $R^{16}$ moieties, the two $R^{17}$ moieties and the two $R^{18}$ moieties each independently is a hydrogen atom or a non-aryl monovalent organic group. Any two or more of $R^{15}$, the two $R^{16}$ moieties, the two $R^{17}$ moieties and the two $R^{18}$ moieties may be bound together to form a ring structure.)

From the availability, curability or adhesiveness viewpoint, $R^{10}$, the two $R^{11}$ moieties, $R^{12}$, $R^{13}$ and the two $R^{14}$ moieties in the general formula (4) each is preferably a hydrogen atom or a substituted or unsubstituted monovalent hydrocarbon group containing 1 to 20 carbon atoms, and more preferably a hydrogen atom or a substituted or unsubstituted monovalent hydrocarbon group containing 1 to 10 carbon atoms. Since, however, the curability decreases as the number of aryl groups increases, it is essential that $R^{10}$, the two $R^{11}$ moieties, $R^{12}$, $R^{13}$ and the two $R^{14}$ moieties each independently be a hydrogen atom or a non-aryl monovalent organic group. From the curability or adhesiveness viewpoint, $R^{15}$, the two $R^{16}$ moieties, the two $R^{17}$ moieties and the two $R^{18}$ moieties in the general formula (5) each is preferably a hydrogen atom or a substituted or unsubstituted monovalent hydrocarbon group containing 1 to 20 carbon atoms, and more preferably a hydrogen atom or a substituted or unsubstituted monovalent hydrocarbon group containing 1 to 10 carbon atoms. Since, however, the curability decreases as the number of aryl groups increases, it is essential that $R^{15}$, the two $R^{16}$ moieties, the two $R^{17}$ moieties and the two $R^{18}$ moieties each independently be a hydrogen atom or a non-aryl monovalent organic group.

Since high activity and good curability can be obtained, preferred as the guanidine compound represented by the general formula (2) are those guanidine compounds of general formula (2) wherein any two or more of $R^4$, the two $R^5$ moieties and the two $R^6$ moieties are bound together to form a ring structure, and particularly preferred are cyclic guanidine compounds represented by the general formula (6):

(6)

(wherein $R^{19}$ is a divalent organic group and the two $R^{20}$ moieties and $R^{21}$ each independently is a hydrogen atom or a monovalent organic group and any two of the two $R^{20}$ moieties and $R^{21}$ may be bound together to form a ring structure.)

From the viewpoints of availability and curability, $R^{19}$ in the general formula (6) is preferably a substituted or unsubstituted divalent hydrocarbon group containing 1 to 10 carbon atoms, more preferably a substituted or unsubstituted divalent hydrocarbon group containing 1 to 10 carbon atoms whose α-carbon to the nitrogen atom has single bonds alone (has no unsaturated bond), still more preferably a substituted or unsubstituted divalent hydrocarbon group containing 1 to 5 carbon atoms whose α-carbon to the nitrogen atom has single bonds alone, and particularly preferably a substituted or unsubstituted divalent hydrocarbon group containing 2 or 3 carbon atoms whose α-carbon to the nitrogen atom has single bonds alone. From the viewpoints of availability and curability, the two $R^{20}$ moieties and $R^{21}$ each is preferably a hydrogen atom or a substituted or unsubstituted monovalent hydrocarbon group containing 1 to 20 carbon atoms, and more preferably a hydrogen atom or a substituted or unsubstituted monovalent hydrocarbon group containing 1 to 10 carbon atoms. From the viewpoints of availability and curability, any two of the two $R^{20}$ moieties and $R^{21}$ preferably is bound together to form a ring structure.)

The above-mentioned amine compound (B), when it has a high melting point, tends to hardly bleed out and, therefore, it is essential that the melting thereof be not lower than 23° C., preferably not lower than 40° C., more preferably not lower than 60° C., still more preferably not lower than 80° C., particularly preferably not lower than 120° C.

In cases where the amine compound (B) contains a small number of carbon atoms (has a low molecular weight), the amine compound becomes readily evaporable and, as a result, the workability and/or curability tends to deteriorate. Therefore, the amine compound (B) preferably contains 2 or more, more preferably 4 or more, still more preferably 6 or more, particularly preferably 7 or more carbon atoms. It is not necessary to specifically define any upper limit to the number of carbon atoms. As a general numerical value range, however, there may be mentioned an upper limit not larger than 10,000. The amine compound preferably has a molecular weight of 60 or higher, more preferably 120 or higher, still more preferably 130 or higher, and particularly preferably 160 or higher. It is not necessary to specifically define any upper limit to the molecular weight. As a general numerical value range, however, there may be mentioned an upper limit not higher than 100,000.

As specific examples of the amine compound (B), there may be mentioned such amidine compounds as 2-methyl-2-imidazoline, 2-ethyl-2-imidazoline, 2-n-propyl-2-imidazoline, 2-isopropyl-2-imidazoline, 2-n-octyl-2-imidazoline, 1-(1-aminoethyl)-2-octyl-2-imidazoline, 2-n-undecyl-2-imidazoline, 4-ethyl-2-undecyl-2-imidazoline, 2-cyclohexyl-2-imidazoline, 2-phenyl-2-imidazoline, 2-benzyl-2-imidazoline and 2-[(3,4-dichlorophenoxy)methyl]-2-imidazoline; such guanidine compounds as 1-n-butylguanidine, 1-benzylguanidine, 1,3-dibenzylguanidine, 1-benzyl-2,3-dimethylguanidine, 1-benzylaminoguanidine, 1-(benzyloxy)guanidine, dicyandiamide, guanylthiourea, 1,5,7-triazabicyclo[4.4.0]dec-5-ene, 2,3,5,6-tetrahydro-3-phenyl-1H-imidazo[1,2-a]imidazole and 1,2-diisopropyl-3-[bis(dimethylamino)methylene]guanidine; and such biguanide compounds as biguanide, 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-benzylbiguanide, 1-phenethylbiguanide, 3-phenethylbiguanide, 1,5-ethylenebiguanide, 1-morpholinobiguanide, 3-morpholinobiguanide, 1-(4-chlorobenzyloxy)biguanide, 1-n-butyl-$N^2$-ethylbiguanide, 1,1'-ethylenebisbiguanide, 1-[3-(diethylamino)propyl]biguanide, 1-[3-(dibutylamino)propyl]biguanide, 1-(morpholinosulfonyl)benzylbiguanide, 1-(hydroxymethyl)biguanide, 1-(2-hydroxyethyl)biguanide and 5-[3-(2,4,5-trichlorophenoxy)propoxy]-1-isopropylbiguanide, among others. These amine compounds may be used singly or two or more of them may be used in combination.

Among the amine compounds (B) mentioned above 2-n-undecyl-2-imidazoline, 2-phenyl-2-imidazoline, 1,5,7-triazacyclo[4.4.0]dec-5-ene, biguanide, 1-n-butylguanidine and 1-n-butylbiguanide are preferred from the curability, adhesiveness and/or bleedout viewpoint, and 1,5,7-triazabicyclo[4.4.0]dec-5-ene and 1-n-butylbiguanide are more preferred.

The level of addition of the amine compound (B) is preferably about 0.001 to 20 parts by weight, more preferably about 0.01 to 15 parts by weight, particularly preferably about 0.1 to 10 parts by weight, per 100 parts by weight of the (A) component organic polymer. When the level of addition of the amine compound (B) is lower than 0.001 part by weight, any practical rate of curing can no longer be obtained in some instances and it may sometimes become difficult for the curing reaction to proceed to a sufficient extent. Conversely, when the level of addition of the amine compound (B) exceeds 20 parts by weight, the pot life becomes too short and the workability tends to become deteriorated.

In the present invention, an organotin compound can be used in combination with the amine compound (B). As specific examples, there may be mentioned dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonylphenoxide), dibutenyltin oxide, dibutyltin oxide, dibutyltin bis(acetylacetonate), dibutyltin bis(ethyl acetoacetonate), dibutyltin oxide-silicate compound reaction products and dibutyltin oxide-phthalate ester reaction products, and the like. The combined use of the amine compound (B), which constitutes the invention, and the organotin compound is expected to enhance the catalytic activity and bring about improvements in curability and depth curability, among others. However, organotin compounds may increase, according to the level of addition thereof, the toxicity of the resulting curable composition, so that the level of addition of organotin compounds in the curable composition of the invention should preferably be as low as possible. The level of addition of organotin compounds is preferably lower than 0.5 parts by weight, more preferably lower than 0.1 parts by weight, and still more preferably lower than 0.05 parts by weight, per 100 parts of the (A) component; substantial absence thereof is particularly preferred. The term "non-organotin-based curable composition" as used herein means that the organotin compound addition level is not higher than 50% by weight of all constituent compounds serving as silanol condensation catalysts. Such organotin compound addition level is preferably not higher than 30% by weight, more preferably not higher than 10% by weight, still more preferably not higher than 1% by weight; substantial absence of any organotin compound in the curable composition is particularly preferred.

Another silanol condensation catalyst (hereinafter, referred to as "metal compound" in some cases) may also be used in combination in an amount such that the effects of the of the amine compound (B), which constitutes the invention, will not be lessened. As specific examples, there may be mentioned carboxylic acid metal salts such as tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates and cerium carboxylates; such titanium compounds as tetrabutyl titanate, tetrapropyl titanate, titanium tetrakis(acetylacetonate), bis(acetylacetonato)diisopropoxytitanium and diisopropoxytitanium bis(ethyl acetoacetate); aluminum compounds such as aluminum tris(acetylacetonate), aluminum tris(ethyl acetoacetate) and diisopropoxyaluminum ethyl acetoacetate; zirconium compounds such as zirconium tetrakis(acetylacetonate); various metal alkoxides such as tetrabutoxyhafnium; organic acidic phosphate esters; organic sulfonic acids such as trifluoromethanesulfonic acid; and inorganic acids such as hydrochloric acid, phosphoric acid and boric acid. The combined use of these curing catalysts is expected to enhance the catalytic activity and bring about improvements in depth curability, thin layer curability and adhesiveness, among others. However, from the environmental stress viewpoint, the level of addition of metal compounds should also preferably be as low as possible. The level of addition of metal compounds is preferably not higher than 10 parts by weight, more preferably not higher than 5 parts by weight, per 100 parts by weight of the (A) component; substantial absence thereof is particularly preferred.

The curable composition of the invention is a non-organotin-based curable composition and, more preferably from the toxicity and/or environmental stress viewpoint, it is a non-organotin-based curable composition substantially free of any organotin compound or such a tin compound as a tin carboxylate, still more preferably a non-organotin-based, metal carboxylate salt-free curable composition substantially free of any organotin compound or any of various metal carboxylate salts, particularly preferably a non-metal catalyst-based curable composition substantially free of any metal carboxylate salt, titanium compound, organotin compound, organoaluminum compound, zirconium compound or like metal element-containing curing catalyst.

A carboxylic acid may also be used in combination as a cocatalyst or promoter in an amount not lessening the effects of the amine compound (B), which constitutes the invention. Specific examples of these carboxylic acids may include linear saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecyl acid, myristic acid, pentadecyl acid, palmitic acid, heptadecyl acid, stearic acid, nonadecanoic acid, arachic acid, behenic acid, lignoceric acid, cerotic acid, montanic acid, melissic acid, and lacceric acid; mono-ene unsaturated fatty acids such as undecylenic acid, linderic acid, tsuzuic acid, physeteric acid, myristoleic acid, 2-hexadecenic acid, 6-hexadecenic acid, 7-hexadecenic acid, palmitoleic acid, petroselinic acid, oleic acid, elaidic acid, asclepic acid, vaccenic acid, gadoleic acid, gondoic acid, cetoleic acid, erucic acid, brassylic acid, selacholeic acid, ximenic acid, rumenic acid, acrylic acid, methacrylic acid, angelic acid, crotonic acid, isocrotonic acid, and 10-undecenic acid; polyene unsaturated fatty acids such as linoelaidic acid, linoleic acid, 10,12-octadecadienic acid, hiragonic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, herring acid, and docosahexaenoic acid; branched fatty acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, and versatic acid; triple bond-containing fatty acids such as propiolic acid, tariric acid, stearolic acid, crepenynic acid, ximenynic acid, and 7-hexadecinic acid; alicyclic carboxylic acids such as naphthenic acid, malvalinic acid, sterculic acid, hydnocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicycle[2.2.1]heptane-1-carboxylic acid, and bicycle[2.2.2]octane-1-carboxylic acid; oxygen-containing fatty acids such as acetoacetic acid, ethoxyacetic acid, glyoxylic acid, glycolic acid, gluconic acid, sabinic acid, 2-hydroxytetradecanoic acid, ipurolic acid, 2,2-dimethyl-3-hydroxypropione acid, 2-hydroxyhexadecanoic acid, jarapinolic acid, juniperinic acid, ambrettolic acid, aleuritic acid, 2-hydroxyoctadecanoic acid, 12-hydroxyoctadecanoic acid, 18-hydroxyoctadecanoic cid, 9,10-dihydroxyoctadecanoic acid, ricinoleic acid, kamlolenic acid, licanic acid, phellonic acid, cerebronic acid, and 2-methyl-7-oxabicyclo[2.2.1]-5-heptene-2-carboxylic acid; halogen-substituted monocarboxylic acids such as chloroacetic acid, 2-chloroacrylic acid, and chlorobenzoic acid; and the like. Examples of the aliphatic dicarboxylic acids include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid, and 1,2,2-trimethyl-1,3-cyclopentanedicarboxylic acid; unsaturated dicarboxylic acids such as maleic acid, fumaric acid, acetylenedicarboxylic acid, and itaconic acid; and the like. Examples of the aliphatic polycarboxylic acid are tricarboxylic acids such as aconitic acid, 4,4-dimethylaconitic acid, citric acid, isocitric acid, and 3-methylisocitric acid; and the like. Examples of the aromatic carboxylic acids are aromatic monocarboxylic acids such as benzoic acid, 9-anthracenecarboxylic acid, atrolactinic acid, anisic acid, isopropylbenzoic acid, salicylic acid, and toluic acid; aromatic polycarboxylic acids such as phthalic acid, isophthalic acid, terephthalic acid, carboxyphenylacetic acid, and pyromellitic acid; and the like. The combined use of these curing catalysts is expected to enhance the catalytic activity and bring about improvements in curability and depth curability, among others. The addition level of the carboxylic acid is preferably 0.01 to 20 parts by weight, and more preferably 0.1 to 10 parts by weight, per 100 parts by weight of the (A) component organic polymer.

In the curable composition of the invention, there may be incorporated an adhesion promoter (C). The adhesion promoter (C) is not particularly limited and there may be mentioned compounds containing a hydrolyzable silyl group and another functional group within the molecule. Such agent may produce a marked adhesiveness improving effect when the composition containing the same is applied, under non-primer conditions or primer treatment conditions, to various adherends, namely inorganic substrates made of glass, aluminum, stainless steel, zinc, copper, mortar, etc., or organic substrates made of polyvinyl chloride, acrylics, polyesters, polyethylene, polypropylene, polycarbonates, etc. In the case of application under non-primer conditions, the improving effect on the adhesiveness to various adherends is especially significant. The compound containing a hydrolyzable silyl group and another functional group is capable of functioning also as a physical property modifier or an inorganic filler dispersibility improving agent, for instance.

As examples of the hydrolyzable silyl group in the compound containing a hydrolyzable silyl group and another functional group, which compound may be used as an adhesion promoter (C), there may be mentioned those groups represented by the general formula (7) wherein X is a hydrolyzable group. Specifically, mention may be made of those groups already enumerated hereinabove as hydrolyzable groups; from the hydrolysis rate viewpoint, a methoxy group and an ethoxy group, among others, are preferred. The number of hydrolyzable groups is preferably 2 or more, in particular 3 or more.

As examples of the functional group other than the hydrolyzable silyl group, there may be mentioned substituted or unsubstituted amino group, mercapto group, epoxy group, carboxyl group, vinyl group, isocyanato group, isocyanurato group and halogen, among others. Among these, substituted or unsubstituted amino group, epoxy group, isocyanato group and isocyanurato group, among others, are preferred because of their high adhesiveness improving effect; the amino group is particularly preferred.

Specific examples of the adhesion promoter are isocyanate silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, and (isocyanatomethyl)dimethoxysilane; aminosilanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, γ-ureidopropyltrimethoxysilane, γ-ureidopropyltriethoxysilane, N-phenyl-γ-aminopropyltrimethoxysilane, N-phenylaminomethyltrimethoxysilane, N-benzyl-γ-aminopropyltrimethoxysilane, N-vinylbenzyl-γ-aminopropyltriethoxysilane, N-(3-triethoxysilylpropyl)-4,5-dihydroimidazole, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane and N,N'-bis[3-(trimethoxysilyl)propyl]ethylenediamine; ketimine type silanes such as N-(1,3-dimethylbutylidene)-3-(triethoxysilyl)-1-propanamine; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane, and mercaptomethyltriethoxysilane; epoxysilanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, γ-acryloyloxypropyltriethoxysilane, and methacryloyloxymethyltrimethoxysilane; halogen-containing silanes such as γ-chloropropyltrimethoxysilane; isocyanurate silanes such as tris(3-trimethoxysilylpropyl)isocyanurate; and the like. Reaction products of the above-mentioned aminosilanes and epoxysilanes, reaction products of the aminosilanes and isocyanate silanes, and the like may be mentioned. Partially condensed silanes may also be mentioned. Examples usable as the adhesion promoter may also include modified derivatives of these exemplified compounds such as amino-modified silyl polymers, silylated aminopolymers, unsaturated aminosilane complexes, phenylamino-long chain alkylsilane, aminosilylated silicones, and silylated polyesters.

The above-exemplified adhesion promoters may be used alone or two or more of them may be used as a mixture.

The level of addition of the component (C) to be used in the practice of the invention is preferably about 0.01 to 20 parts by eight, more preferably about 0.1 to 10 parts by weight, particularly preferably about 1 to 7 parts by weight, per 100 parts by weight of the (A) component organic polymer. When the level of addition of the component (C) is lower than 0.01 part by weight, any sufficient level of adhesiveness may not be obtained in some instances. Conversely, when the level of addition of the component (C) is above 20 parts by weight, it is sometimes impossible to obtain practical depth curability.

Examples of the adhesion promoters (C), which constitutes the invention, other than the above-mentioned compounds are not particularly limited and for example, epoxy resins, phenol resins, sulfur, alkyl titanates, aromatic polyisocyanate and the like may be exemplified. The above-exemplified adhesion promoters may be used alone or two or more of them may be used as a mixture. However, epoxy resins may lower, according to the level of addition thereof, the catalytic activity of the component (B) and, therefore, the level of addition of epoxy resins in the curable composition of the invention is preferably as low as possible. The level of addition of epoxy resins is preferably not higher than 5 parts by weight, more preferably not higher than 0.5 part by weight, per 100 parts by weight of the component (A); substantial absence thereof is particularly preferred.

In the composition of the invention, there may be incorporated a filler. Specific examples of the filler may include reinforcing fillers such as fumed silica, precipitated silica, crystalline silica, fused silica, dolomite, silicic anhydride, hydrous silicic acid, and carbon black; fillers such as ground calcium carbonate, colloidal calcium carbonate, magnesium carbonate, china clay, calcined clay, clay, talc, titanium oxide, bentonite, organic bentonite, ferric oxide, aluminum fine powder, flint powder, zinc oxide, activated zinc white, shirasu balloon, glass microballoon, organic microballoon of phenol resins and vinylidene chloride resins, and resin powder such as PVC powder and PMMA powder; fibrous fillers such as glass fibers and filaments; and the like. The use amount of the filler is preferably in a range from 1 to 250 parts by weight and more preferably in a range from 10 to 200 parts by weight per 100 parts by weight of the polymer as the component (A).

In the case of obtaining a cured product with high strength by using these fillers, it is preferable to use mainly a filler selected from fumed silica, precipitated silica, crystalline silica, fused silica, dolomite, silicic anhydride, hydrous silicic acid and carbon black, surface-treated fine calcium carbonate, calcined clay, clay, activated zinc white and the like and if it is used in a range from 1 to 200 parts by weight per 100 parts by weight of the reactive silicon group-containing organic polymer of the component (A), a preferred result can be obtained. In the case where a cured product with low strength and high elongation at break is obtained, a preferred result can be attained by mainly using 5 to 200 parts by weight of a filler selected from titanium oxide, calcium carbonate such as ground calcium carbonate, magnesium carbonate, talc, ferric oxide, zinc oxide, shirasu balloon and the like per 100 parts by weight of the reactive silicon group-containing organic polymer of the component (A). In general, calcium carbonate has more significant effect of improving the strength at break, elongation at break, and adhesion of a cured product, as it has higher specific surface area. These fillers may be used alone or two or more of the may be used as a mixture. In the case where calcium carbonate is used, it is desirable to use surface-treated fine calcium carbonate with small particle diameter, ground calcium carbonate and the like calcium carbonate with large particle diameter in combination. The surface-treated fine calcium carbonate is preferable to have a particle diameter of 0.5 μm or smaller and surface-treated with a fatty acid or a fatty acid salt. Calcium carbonate with a large particle diameter is preferable to have a particle diameter of 1 μm or larger, and surface-untreated one may be used.

To improve the workability (antisagging property) of the composition and deluster the cured product surface, it is preferable to add an organic balloon and/or an inorganic balloon. These fillers may be surface-treated and may be used alone or two ore more of them may be used in combination. To improve the workability (antisagging property), the particle diameter of the balloons is preferable to be 0.1 mm or smaller. To deluster the cured product surface, the above-mentioned particle diameter is preferable to be 5 to 300 μm.

Because the composition of the invention gives the cured product with excellent chemical resistance, for example, the composition can be suitably applied to the joints of exterior walls of houses, such as siding boards, particularly ceramic siding boards, adhesives for exterior wall tiles, adhesives for exterior wall tiles that remain in joints as they are, and the like, but it is preferable to match the sealant design to the exterior wall design. As exterior walls, in particular, those with a deluxe feeling created by spatter coating or incorporation of colored aggregates etc. become to be used. When a scaly or particulate substance not less smaller 0.1 mm, preferably about 0.1 to 5.0 mm, in diameter is formulated into the composition of the invention, the cured product matches up well with such deluxe-finished exterior walls and, in addition, shows good chemical resistance. Thus, the composition is enabled to give the cured product capable of retaining the appearance over years. When a particulate substance is formulated, a pebbled or sandstone-like coarse surface texture can be expressed. When a scaly substance is formulated, an irregular surface resulting from its scaly shape can be expressed.

As described in Japanese Kokai Publication Hei-9-53063, the diameter, addition amount, and materials desirable for the scaly or particulate substance are as follows.

The diameter is 0.1 mm or larger and preferably about 0.1 to 5.0 mm and may be selected properly in accordance with the material, the pattern, or the like of the exterior wall. Those substances with a diameter of about 0.2 to 5.0 mm or about 0.5 to 5.0 mm are also usable. In the case of a scaly substance, the thickness to the diameter is proper to be about 1/10 to 1/5 (that is, the diameter is proper to be about 0.01 to 1.00 mm). The scaly or particulate substance is previously mixed with a base material of sealant and transported to the working field as a sealant or mixed with the base material of sealant at the working field when used.

The scaly or particulate substance is added in a range from about 1 to 200 parts by weight per 100 parts by weight of the composition such as the sealant composition or the adhesive composition. The addition amount is properly selected in accordance with the size of the scaly or particulate substance, the material and patterns of the exterior wall, and/or the like.

Examples to be used as the scaly or particulate substance may be natural substances such as silica sand and mica; synthetic rubber, synthetic resins, and inorganic material such as alumina. To improve the design quality when the substance is used for filling the joint, the scaly or particulate substance is colored with a proper color matched with the material and patterns of the exterior wall, and the like.

A preferable finishing method is described in Japanese Kokai Publication Hei-9-53063.

Also, if a balloon (preferably those with an average particle diameter of 0.1 mm or larger) is used for the same purpose, the pebbled or sandstone-like coarse surface texture can be obtained and the weight can be reduced. As described in Japanese Kokai Publication Hei-10-251618, the diameter, the addition amount, and the type of a preferable balloon are as follows.

The balloon is a spherical filler having a hollow inside. The material of the balloon may be inorganic materials such as glass, shirasu, and silica; and organic materials such as phenol resins, urea resins, polystyrene, and Saran, however it is not limited to these examples and an inorganic material and an organic material may be compounded or layered to form a plurality of layers. Inorganic, or organic, or their composite balloons may be used, for example. Also, the balloon to be used may be a single type one or a plurality of kinds of balloons of different materials may be used as a mixture. Further, the surface of the balloon to be used may be processed or coated, or may be treated with various kinds of surface treating agents. For example, an organic balloon may be coated with calcium carbonate, talc, titanium oxide, or the like; or an inorganic balloon may be surface-treated with an adhesion promoter.

To obtain the pebbled or sandstone-like coarse surface texture, the diameter of the balloon is preferably 0.1 mm or larger. The balloons having a diameter of about 0.2 to 5.0 mm or about 0.5 to 5.0 mm are also usable. In the case where the diameter is smaller than 0.1 mm, even if a large quantity of the balloon is added, it only results in increase of the viscosity of the composition and no coarse surface texture can be obtained in some cases. The addition amount of the balloon may be easily determined in accordance with the coarseness of the desired pebbled or sandstone-like texture. Generally, it is desirable to add the balloon having a diameter of 0.1 mm or larger in an amount of 5 to 25% by volume in the composition. If the concentration by volume of the balloon is lower than 5% by volume, no coarse surface texture can be obtained. If the concentration exceeds 25% by volume, there is a tendency of increasing the viscosity of the sealant and the adhesive, worsening the workability, increasing the modulus of the cured product, and thus deteriorating the basic properties of the sealant and adhesive. The concentration by volume is particularly preferably 8 to 22% by volume in terms of the balance with the basic properties of the sealant.

In the case of using balloons, it is allowed to use a slip preventing agent as described in Japanese Kokai Publication 2000-154368 and an amine compound, particularly a primary and/or a secondary amine with a melting point of 35° C. or higher as described in Japanese Kokai Publication 2001-164237 for making the surface of a cured product uneven and delustered.

Specific examples of the balloon are described in Japanese Kokai Publication Hei-2-129262, Japanese Kokai Publication Hei-4-8788, Japanese Kokai Publication Hei-4-173867, Japanese Kokai Publication Hei-5-1225, Japanese Kokai Publication Hei-7-113073, Japanese Kokai Publication Hei-9-53063, Japanese Kokai Publication Hei-10-251618, Japanese Kokai Publication 2000-154368, Japanese Kokai Publication 2001-164237, WO 97/05201 and the like.

Even in the case where the composition of the invention contains sealant-cured particles, the cured product can be provided with an uneven surface and an improved design. The diameter, addition amount, and usable materials etc. for the sealant-cured particles are preferable to be as described in Japanese Kokai Publication 2001-115142. The diameter is preferably 0.1 to 1 mm and more preferably about 0.2 to 0.5 mm. The addition amount is preferably in a range from 5 to 100% by weight and more preferably in a range from 20 to 50% by weight in the curable composition. The usable materials may be urethane resins, silicones, modified silicones, polysulfide rubber and the like and they are not particularly limited if they are usable for a sealant. Modified silicone type sealants are preferable.

Further, a silicate may be used for the composition of the invention. The silicate works as a crosslinking agent and has a function of improving the recovery, durability, and creep resistance of the organic polymer of the component (A). Further, it also has a function to improve the adhesion and water-proof adhesion, and adhesion durability at a high temperature and high humidity condition. Tetraalkoxysilane or partially hydrolyzed condensates of the tetraalkoxysilane may be used as the silicate. In the case where a silicate is used, the use amount thereof is preferably 0.1 to 20 parts by weight and more preferably 0.5 to 10 parts by weight per 100 parts by weight of the organic polymer of the component (A).

Specific examples of the silicates are tetraalkoxysilanes (tetraalkyl silicates) such as tetramethoxysilane, tetraethoxysilane, ethoxytrimethoxysilane, dimethoxydiethoxysilane, methoxytriethoxysilane, tetra(n-propoxy)silane, tetra(isopropoxy)silane, tetra(n-butoxy)silane, tetra(iso-butoxy)silane, and tetra(tert-butoxysilane), and their partially hydrolyzed condensates.

The partially hydrolyzed condensates of the tetraalkoxysilanes are more preferable since the condensates are more effective to improve the recovery, durability and creep resistance of the curable composition of the invention than tetraalkoxysilanes.

The above-mentioned partially hydrolyzed condensates of the tetraalkoxysilanes are obtained by a common method of adding water to a tetralkoxysilane and thereby partially hydrolyzing and condensing the tetraalkoxysilane. Further, commercialized products may be used as the partially hydrolyzed condensates of the organosilicate compounds. Examples of the condensates are Methyl silicate 51 and Ethyl silicate 40 (both manufactured by Colcoat Co., Ltd.), and the like.

A plasticizer may be used in the composition of the present invention. Addition of the plasticizer may adjust the viscosity and slump property of the curable composition, and the mechanical properties such as tensile strength and elongation property of the cured product obtained from the curable composition. As example of the plasticizer, there may be mentioned phthalic acid esters such as dibutyl phthalate, diheptyl phthalate, bis(2-ethylhexyl) phthalate, and butyl benzyl phthalate; non-aromatic dibasic acid esters such as dioctyl adipate, dioctyl sebacate, dibutyl sebacate, and diisodecyl succinate; aliphatic esters such as butyl oleate and methyl acetylricinoleate; phosphoric acid esters such as tricresyl phosphate and tributyl phosphate; trimellitic acid esters; chloroparaffins; hydrocarbon oils such as alkyldiphenyl and partially hydrogenated terphenyl; processed oils; epoxy plasticizers such as epoxylated soybean oil and benzyl epoxystearate.

Further, a polymer plasticizer may be used. If the polymer plasticizer is used, the initial physical properties can be maintained for a long duration as compared with the case of using a low molecular weight plasticizer, which is a plasticizer containing no polymer component in the molecule. Further, the drying property (also called as coatability) is also improved in the case where an alkyd coating material is applied to the cured product. Specific examples of the polymer plasticizer are vinyl polymers obtained by polymerizing vinyl monomers by various methods; polyalkylene glycol esters such as diethylene glycol dibenzoate, triethylene glycol dibenzoate, pentaerythritol ester; polyester-type plasticizers obtained from bibasic acids such as sebacic acid, adipic acid, azelaic acid, and phthalic acid and dihydric alcohols such as ethylene glycol, diethylene glycol, triethylene glycol, propylene glycol, and dipropylene glycol; polyether polyols such as polyethylene glycol, polypropylene glycol, and polytetramethylene glycol having a molecular weight of 500 or higher and more preferably 1,000 or higher, polyether polyol derivertives obtained by converting hydroxyl groups of these polyether polyols into ester groups, ether groups or the like, and the like polyethers; polystyrenes such as polystyrene and poly(α-methylstyrene); polybutadiene, polybutene, polyisobutylene, butadiene-acrylonitrile, polychloroprene and the like, however the polymer plasticizer is not limited to these examples.

Among the exemplified polymer plasticizers, those which are compatible with the polymer of the component (A) are preferable. From this viewpoint, polyethers and vinyl polymers are preferable. Further, from the viewpoint where the surface curability and deep part curability are improved and curing delay after storage does not occur, polyethers are preferably used and polypropylene glycol is more preferably used as a plasticizer. Additionally, in terms of the compatibility, weather resistance, and heat resistance, vinyl polymers are preferable. Among vinyl polymers, acrylic polymers and/or methacrylic polymers are preferable and acrylic polymers such as polyacrylic alkyl esters are more preferable. A synthesis method of the polymers is preferably a living radical polymerization method and more preferably an atom transfer radical polymerization method since these are suitable for narrowing the molecular weight distribution and lowering the viscosity. Also, a polymer obtained by so-called SGO process, that is a polymer obtained by continuous bulk polymerization of an acrylic alkyl ester monomer at high temperature and high pressure as described in Japanese Kokai Publication 2001-207157 is preferably used.

The number average molecular weight of the polymer plasticizer is preferably 500 to 15,000, more preferably 800 to 10,000, furthermore preferably 1,000 to 8,000, even more preferably 1,000 to 5,000, and most preferably 1,000 to 3,000. If the molecular weight is too low, the plasticizer is eluted by heat or rain fall with the lapse of time so as to fail to maintain the initial physical properties for a long duration and therefore fail to improve the alkyd coatability. If the molecular weight of the polymer is too high, the viscosity is increased to worsen the workability. Although the molecular weight distribution of the polymer plasticizer is not particularly limited, it is preferably narrow, namely a Mw/Mn ratio (weight average molecular weight/number average molecular weight) is preferably lower than 1.80. It is further preferably 1.70 or lower, furthermore preferably 1.60 or lower, even more preferably 1.50 or lower, particularly preferably 1.40 or lower, and most preferably 1.30 or lower.

The number average molecular weight is measured by a GPC method in the case of a vinyl polymer and by a terminal group analysis method in the case of a polyether polymer. The molecular weight distribution (Mw/Mn) is measured by the GPC method (conversion into polystyrene). The number average molecular weight and molecular weight distribution can be measured as values on the polystyrene equivalent basis using, for example, the following:

Pumping system: Tosoh HLC-8120 GPC;
Column: Tosoh TSK-GEL H type;
Solvent: THF.

The measurement methods are not particularly restricted.

The polymer plasticizer may or may not contain the reactive silicon group. In the case of containing the reactive silicon group, it works as a reactive plasticizer and prevents transfer of the plasticizer from the cured product. In the case where the reactive silicon group is contained, the number of the group is preferably 1 or lower and more preferably 0.8 or lower on average per one molecule. In the case where the plasticizer having a reactive silicon group, particularly an oxyalkylene polymer having a reactive silicon group, is used, the number average molecular weight thereof is necessarily to be lower than that of the polymer of the component (A).

The plasticizer may be used alone or two or more of these may be used in combination. Further, a low molecular weight plasticizer and the polymer plasticizer may be used in combination. These plasticizers may be added at the time of polymer production.

The use amount of the plasticizer is preferably 5 to 150 parts by weight, more preferably 10 to 120 parts by weight, and still more preferably 20 to 100 parts by weight, per 100 parts by weight of the polymer of the component (A). If it is less than 5 parts by weight, the effect as a plasticizer is not exhibited and if it exceeds 150 parts by weight, the mechanical strength of the cured product tends to become insufficient.

Also, thermally-expansive hollow microspheres described in Japanese Kokai Publication 2004-51701, Japanese Kokai Publication 2004-66749 and the like can be used. The phrase "thermally-expansive hollow microspheres" means plastic spheres obtained by spherically enclosing low boiling point compounds such as a hydrocarbon with 1 to 5 carbon atoms by a polymer coating material (vinylidene chloride copolymer, an acrylonitrile copolymer, or a vinylidene chloride-acrylonitrile copolymer). Heating of the adhesion part formed using the composition of the invention increases the gas pressure in the coat of the thermally-expansive hollow microspheres and softens the polymer coating material to drastically expand the volume and separate the adhesion interface. Addition of the thermally-expansive hollow microspheres gives a thermally peelable adhesive composition which can be easily peeled by heating at the time of disposal without breaking materials and using any organic solvents.

The composition of the invention may contain a pressure-sensitive adhesion promoter. The pressure-sensitive adhesion promoter is not particularly limited and commonly used ones may be used regardless of the phase thereof being solid or liquid at an ambient temperature. Specific examples thereof may be styrene block copolymers, hydrogenated products thereof, phenol resins, modified phenol resins (e.g. cashew oil-modified phenol resins, tall oil-modified phenol resins, and the like), terpene phenol resins, xylene-phenol resins, cyclopentadiene-phenol resins, cumarone indene resins, rosin resins, rosin ester resins, hydrogenated rosin ester resins, xylene resins, low molecular weight polystyrene resins, styrene copolymer resins, petroleum resins (e.g., C5 hydrocarbon resins, C9 hydrocarbon resins, C5 hydrocarbon-C9 hydrocarbon copolymer resins, and the like), hydrogenated petroleum resins, terpene resins, DCPD resins petroleum resins, and the like. They may be used alone and two or more of them may be used in combination. Examples of the styrene block copolymers and the hydrogenated products thereof are styrene-butadiene-styrene block copolymer (SBS), styrene-isoprene-styrene block copolymer (SIS), styrene-ethylene-butylene-styrene block copolymer (SEBS), styrene-ethylene-propylene-styrene block copolymer (SEPS), styrene-isobutylene-styrene block copolymer (SIBS), and the like. The above-mentioned pressure-sensitive adhesion promoters may be used alone or two or more of them may be used in combination.

Preferably, the pressure-sensitive adhesion promoter may be used in a range from 5 to 1,000 parts by weight and more preferably 10 to 100 parts by weight per 100 parts by weight of the component (A).

The composition of the invention may contain a solvent or a diluent. The solvent or diluent is not particularly limited and aliphatic hydrocarbons, aromatic hydrocarbons, alicyclic hydrocarbons, halogenated hydrocarbons, alcohols, esters, ketones, ethers and the like may be used. In the case where a solvent or diluent is used, in terms of air pollution at the time of using the composition indoors, the boiling point of the solvent is preferably 150° C. or higher, more preferably 200° C. or higher, and further preferably 250° C. or higher. The above-mentioned solvents or diluents may be used alone or two or more of them may be used in combination.

Based on the necessity, the curable composition of the invention may contain a physical property modifier for adjusting tensile properties of the cured product to be obtained. The physical property modifier is not particularly limited and examples thereof are alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane, γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropylmethyldimethoxysilane; silicone vanishes; polysiloxanes; and the like. Use of the above-mentioned physical property modifiers increases the hardness of the cured product obtained by curing the composition of the invention, or, on the contrary, decreases the hardness in order to increase the elongation at break. The above-mentioned physical property modifiers may be used alone or two or more of them may be used in combination.

Particularly, a compound from which a compound containing a monovalent silanol group in a molecule is produced by hydrolysis has a function of decreasing the modulus of the cured product without worsening the stickiness of the cured product surface. Particularly, a compound from which trimethylsilanol is produced is preferable. Examples of the compound from which a compound containing a monovalent silanol group in a molecule is produced by hydrolysis are compounds described in Japanese Kokai Publication Hei-5-117521. Further, examples of the compound may include derivatives of alkylalcohols, such as hexanol, octanol and decanol, from which silicon compounds forming $R_3SiOH$ such as trimethylsilanol are produced by hydrolysis; derivatives of polyhydric alcohols having 3 or more hydroxyl groups, such as trimethylolpropane, glycerin, pentaerythritol and sorbitol, as described in Japanese Kokai Publication Hei- 11-241029, from which silicone compounds forming $R_3SiOH$ such as trimethylsilanol are produced by hydrolysis.

Examples may further include oxypropylene polymer derivatives as described in Japanese Kokai Publication Hei-7-258534 from which silicon compounds forming $R_3SiOH$ such as trimethylsilanol are produced by hydrolysis. Usable examples may also include polymers having a silicon-containing group to be converted into monosilanol-containing compounds by hydrolysis with a crosslinkable and hydrolysable silicon-containing group, as described in Japanese Kokai Publication Hei-6-279693.

Preferably, the physical property modifier is used in a range from 0.1 to 20 parts by weight and more preferably from 0.5 to 10 parts by weight per 100 parts by weight of the organic polymer (A) having a reactive silicon group.

The curable composition of the invention may contain a thixotropic agent (antisagging agent) for preventing sagging in order to improve the workability, according to need. The antisagging agent is not particularly limited and polyamide waxes; hydrogenated castor oil derivatives; metal soaps such as calcium stearate, aluminum stearate, and barium stearate; and the like. Further, if rubber powders with a particle diameter of 10 to 500 µm as described in Japanese Kokai Publication Hei-11-349916 and/or organic fibers as described in Japanese Kokai Publication 2003-155389 are used, the composition with high thixotropy and good workability can be obtained. These thixotropic agents (antisagging agents) may be used alone or two or more of them may be used in combination. The thixotropic agent is preferably used in a range from 0.1 to 20 parts by weight per 100 parts by weight of the total of the component (A) and the component (B).

The composition of the invention may contain a compound having an epoxy group in one molecule. Addition of the compound having an epoxy group increases the recovery of the cured product. Examples of the compound having an epoxy group may include epoxylated unsaturated fats and oils, epoxylated unsaturated fatty acid esters, alicyclic epoxy compounds and epichlorohydrin derivatives, mixtures of these compounds, and the like. More particular examples thereof are epoxylated soybean oils, epoxylated linseed oil, bis(2-ethylhexyl)-4,5-epoxycyclohexane-1,2-dicarboxylate (E-PS), epoxyoctyl stearate, epoxybutyl stearate and the like. E-PS is particularly preferable among them. The epoxy compound is preferably used in a range from 0.5 to 50 parts by weight per 100 parts by weight of the organic polymer (A) having reactive silicon group.

The composition of the invention may contain a photocurable substance. Addition of the photocurable substance makes it possible to form a coating of the photocurable substance on the cured product surface and to improve the stickiness and weather resistance of the cured product. The photocurable substance is a compound causing chemical changes in the molecular structure within a very short time by light radiation and thereby causing changes in physical properties such as curing. This kind of compounds is known well in form of an organic monomer, an oligomer, a resin, a composition containing them, and many others. All kinds of commercialized products may be used. Typical examples thereof are unsaturated acrylic compounds, polyvinyl cinnamates, azido resins and the like. The unsaturated acrylic compounds may include monomers and oligomers having one or several acrylic or methacrylic unsaturated groups, and mixtures thereof; e.g. monomers and oligoesters with a molecular weight of 10,000 or lower, such as propylene (or butylene, or ethylene) glycol di(meth)acrylate and neopentyl glycol di(meth)acrylate, and the like. As more specific examples, there may be mentioned such special acrylates (difunctional) as ARONIX M-210, ARONIX M-215, ARONIX M-220, ARONIX M-233, ARONIX M-240, and ARONIX M-245; such trifunctional ones as ARONIX M-305, ARONIX M-309, ARONIXM-310, ARONIXM-315, ARONIXM-320, and ARONIXM-325; such polyfunctional ones as ARONIX M-400; and the like. Compounds containing an acrylic functional group are particularly preferable and compounds containing 3 or more functional groups on average in one molecule are more preferable. (All the above-mentioned ARONIX species are products of Toagosei Co., Ltd.)

Examples of the polyvinyl cinnamates are photosensitive resins having a cinnamoyl group as a photosensitive group and obtained by esterifying a polyvinyl alcohol with a cinnamic acid and many polyvinyl cinnamate derivatives as well. The azido resins are known as photosensitive resins having an azido group as a photosensitive group and in general, may include photosensitive rubber liquids obtained by adding a diazido compound as a photosensitizer, and further, detailed examples are found in "Kankosei Jushi (Photosensitive Resins)" (published Mar. 17, 1972 by Insatsu Gakkai Shuppanbu, pages 93 ff, 106 ff, 117 ff). They may be used alone or as a mixture and if necessary, a sensitizer may be added. In the case where a sensitizer such as ketones and nitro compounds or a promoter such as amines is added, the effect is improved in some cases. The photocurable substance is preferably used in a range from 0.1 to 20 parts by weight and more preferably in a range from 0.5 to 10 parts by weight per 100 parts by weight of the organic polymer (A) having a reactive silicon group. If it is lower than 0.1 parts by weight, the weather resistance increasing effect is not caused and if it exceeds 20 parts by weight, the cured product tends to become so hard to cause cracks.

The composition of the invention may contain an oxygen-curable substance. The oxygen-curable substance may include unsaturated compounds reactive on oxygen in the air and has function of forming a cured coating in the vicinity of the cured product surface by reaction with oxygen in the air and thereby preventing stickiness of the surface and adhesion of the dust and dirt to the cured product surface. Specific examples of the oxygen-curable substance are dry oils represented by tung oil and linseed oil and various kinds of alkyd resins obtained by modifying these compounds; acrylic polymers, epoxy resins, and silicon resins modified by dry oils; liquid polymers such as polymers of 1,2-polybutadiene, 1,4-polybutadiene, $C_5$-$C_8$ diene obtained by polymerization or copolymerization of diene compounds such as butadiene, chloroprene, isoprene, and 1,3-pentadiene, liquid copolymers such as NBR and SBR obtained by copolymerization of the diene compounds with a copolymerizable monomer such as acrylonitrile and stylene in a manner that the diene compounds form main components, various modified compounds of them (e.g. maleated derivatives, boiled oil-modified derivatives, and the like), and the like. They may be used alone or two or more of them may be used in combination. Tung oil and liquid diene polymers are particularly preferable among them. Further, combination use of a catalyst promoting the oxidation curing reaction or a metal drier may increase the effect in some cases. Examples of the catalyst and the metal drier are metal salts such as cobalt naphthenate, lead naphthenate, zirconium naphthenate, cobalt octylate, and zirconium octylate, amine compounds, and the like. The use amount of the oxygen-curable substance is preferably in a range from 0.1 to 20 parts by weight and more preferably from 0.5 to 10 parts by weight per 100 parts by weight of the organic polymer (A) having a reactive silicon group. If the use amount is lower than 0.1 parts by weight, the contamination improvement effect becomes insufficient and if it exceeds 20 parts by weight, the tensile property and the like of the cured product tends to be deteriorated. As described in Japanese Kokai Publication Hei-3-160053, the oxygen-curable substance may be used preferably in combination with the photocurable substance.

The composition of the invention may contain an antioxidant (anti-aging agent). If the antioxidant is used, the heat resistance of the cured product can be increased. Examples of the antioxidant are hindered phenol-type antioxidants, monophenol-type antioxidants, bisphenol-type antioxidants, and polyphenol-type antioxidants, and hinderd phenol-type antioxidants are particularly preferable. Similarly, usable examples thereof are hindered amine-type light stabilizers commercialized as TINUVIN 622LD, TINUVIN144, CHIMASSORB 944LD, and CHIMASSORB 119FL (all manufactured by Ciba Specialty Chemicals), MARK LA-57, MARK LA-62, MARK LA-67, MARK LA-63, and MARK LA-68 (all manufactured by Adeka Argus Chemical Co., Ltd.), Sanol LS-770, Sanol LS-765, Sanol LS-292, Sanol LS-2626, Sanol LS-1114, and Sanol LS-744 (all manufactured by Sankyo Co., Ltd.). Specific examples of the antioxidant are also described in Japanese Kokai Publication Hei-4-283259 and Japanese Kokai Publication 9-194731. The use amount of the antioxidant is preferably in a range from 0.1 to 10 parts by weight and more preferably from 0.2 to 5 parts by weight per 100 parts by weight of the organic polymer (A) having a reactive silicon group.

The composition of the invention may contain a light stabilizer. If the light stabilizer is used, the photo-oxidation deterioration of the cured product can be prevented. Examples to be used as the light stabilizer may include benzotriazole compounds, hindered amine compounds, benzoate compounds and the like, and hindered amine compounds are particularly preferable. The use amount of the light stabilizer is preferably in a range from 0.1 to 10 parts by weight and more preferably from 0.2 to 5 parts by weight per 100 parts by weight of the organic polymer (A) having a reactive silicon group. Specific examples of the light stabilizer are also described in Japanese Kokai Publication Hei-9-194731.

In the case where the photocurable substance is added to the composition of the invention, particularly in the case where an unsaturated acrylic compound is added, it is preferable to use a tertiary amine-containing hindered amine-type light stabilizer as described in Japanese Kokai Publication Hei-5-70531 as the hindered amine-type light stabilizer in terms of the improvement of the storage stability of the composition. Examples of the tertiary amine-containing hindered amine-type light stabilizer are TINUVIN 622LD, TINUVIN 144, and CHIMASSORB 119FL (all manufactured by Ciba Specialty Chemicals); MARK LA-57, LA-62, LA-67, and LA-63 (all manufactured by Adeka Argus Chemical Co., Ltd.); Sanol LS-765, LS-292, LS-2626, LS-1114, and LS-744 (all manufactured by Sankyo Co., Ltd.); and the like stabilizers.

The composition of the invention may contain an ultraviolet absorber. Use of the ultraviolet absorber can increase the weather resistance of the surface of the cured product. Examples of the ultraviolet absorber may be benzophenone compounds, benzotriazole compounds, salicylate compounds, substituted tolyl compounds, metal chelate compounds and the like, and benzotriazole compounds are particularly preferable. The use amount of the ultraviolet absorber is preferably in a range from 0.1 to 10 parts by weight and more preferably from 0.2 to 5 parts by weight per 100 parts by weight of the organic polymer (A) having a reactive silicon group. It is preferable to use a phenol-type or hindered phenol-type antioxidant, a hindered amine-type light stabilizer, and a benzotriazole-type ultraviolet absorber in combination.

The curable composition of the invention may contain a phosphorus-type plasticizer such as ammonium polyphosphate and tricresyl phosphate and a flame retardant such as aluminum hydroxide, magnesium hydroxide, and thermally expansive graphite. The above-mentioned flame retardant may be used alone or two or more of them may be used in combination.

The flame retardant is used in a range from 5 to 200 parts by weight and preferably from 10 to 100 parts by weight per 100 parts by weight of the component (A).

A solvent may be used in the composition of the invention for reducing the viscosity of the composition, enhancing the thixotropic properties and improving the workability The solvent is not particularly restricted but includes various compounds. Specific examples are hydrocarbon solvents such as toluene, xylene, heptane, hexane and petroleum solvents, halogenated solvents such as trichloroethylene, ester solvents such as ethyl acetate and butyl acetate, ketone solvents such as acetone, methyl ethyl ketone and methyl isobutyl ketone, alcohol solvents such as methanol, ethanol and isopropyl alcohol, and silicone solvents such as hexamethylcyclotrisiloxane, octamethylcyclotetrasiloxane and decamethylcyclopentasiloxane. These solvents may be singly or two or more of them may be used in combination.

However, the use of a solvent at high addition levels sometimes results in increased toxicity to human bodies and further results in volume decreases or shrinkage of cured products in some instances. Therefore, the solvent addition level is preferably not higher than 3 parts by weight, more preferably not higher than 1 part by weight, per 100 parts by weight of the (A) component organic polymer; substantial absence of any solvent is most preferred.

The curable composition of the invention may contain various kinds of additives for adjusting the various physical properties of the curable composition or the cured product of the composition according to need. Examples of the additives are a curability adjustment agent, a radical inhibitor, a metal inactivation agent, an ozone deterioration-preventing agent, a phosphorus-type peroxide decomposing agent, a lubricant, a pigment, a foaming agent, a repellent for ants, anti-fungal agent and the like. These various additives may be used alone or two or more of them may be used in combination. Specific examples other than the examples of the additives described in this specification are described in Japanese Kokoku Publication Hei-4-69659, Japanese Kokoku Publication Hei-7-108928, Japanese Kokai Publication Sho-63-254149, Japanese Kokai Publication Sho-64-22904, Japanese Kokai Publication 2001-72854 and the like.

The curable composition of the invention may be produced as a one-pack formulation, which is to be cured by the moisture in the air after application, by compounding all the components/ingredients and tightly sealing in a container for storage, or as a two-pack type formulation by separately mixing, as curing agents, components such as a curing catalyst, a filler, a plasticizer, and water and mixing the mixture with a polymer composition together prior to use. In terms of the workability, the one-pack is preferable.

In the case where the curable composition is a one-pack type one, since all of the components are previously mixed, it is preferable to previously dehydrate and dry the components containing water prior to use or to carry out dehydration by vacuum etc. during the components are kneaded. In the case where the curable composition is two-pack type, gelation hardly occurs if a slight amount of water is contained in the component mixture, since there is no need to add a curing catalyst to the base components containing the reactive silyl group-containing polymer. However, in the case where long term storage stability is required, it is preferable to carry out dehydration and drying. In the case where the composition is a powder or the like solid, the dehydration and drying method is preferably heat drying or vacuum dehydration and in the case where it is liquid, vacuum dehydration or dehydration using a synthetic zeolite, activated alumina, silica gel, burnt lime, magnesium oxide or the like is preferable. In addition to the above-mentioned dehydration and drying methods, an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane may be added in order to cause reaction with water for dehydration. Alternatively, an oxazolidine compound such as 3-ethyl-2-methyl-2-(3-methylbutyl)-1,3-oxazolidine may be added and reacted with water for dehydration. Further, a small amount of an isocyanate compound may be added in order to cause reaction of its isocyanate group with water for dehydration. Addition of the alkoxysilane compound, the oxazolidine compound, and the isocyanate compound improve the storage stability.

The use amount of a dehydration agent, particularly a silicon compound reactive with water such as vinyltrimethoxysilane may be preferably in a range from 0.1 to 20 parts by weight and more preferably from 0.5 to 10 parts by weight per 100 parts by weight of the reactive silyl group-containing organic polymer (A).

The method for producing the curable composition of the invention is not particularly limited and a common method may be employed which involves, for example, formulating the above-mentioned components, kneading the components by a mixer, a roll, a kneader or the like stirring device at an ambient temperature or under heating condition; or dissolving the components by adding a small amount of a proper solvent for mixing.

When the curable composition of the invention is exposed to the atmosphere, the composition forms a three-dimensional mesh structure by reaction with water and then is cured into a solid having rubber-like elasticity.

EFFECT OF THE INVENTION

The curable composition of the present invention allows slight bleedout of a liquid compound to occur to the cured product and shows good curability and adhesiveness using a non-organotin curing catalyst, an amine compound, as a silanol condensation catalyst.

BEST MODE FOR CARRYING OUT THE INVENTION

Next, the invention will be described more in detail with reference to Examples and Comparative Examples, however the invention should not be limited to these examples.

SYNTHESIS EXAMPLE 1

Propylene oxide was polymerized by using polyoxypropylene diol with a molecular weight of about 2,000 as an initiator and a zinc hexacyanocobaltate-glyme complex catalyst in order to obtain a polypropylene oxide with a number average molecular weight of about 25,500 (measured by using HLC-8120 GPC manufactured by Tosoh Corporation as a solution transporting system; TSK-GEL H column manufactured by Tosoh Corporation as a column; and THF as a solvent: the molecular weight was determined on the basis of conversion into polystyrene). Next, a NaOMe methanol solution of which the NaOMe content was 1.2 equivalent weights relative to the hydroxyl groups of the hydroxyl group-terminated polypropylene oxide was added followed by removal of methanol, and then allyl chloride was added thereto in order to convert the terminal hydroxyl groups of the hydroxyl group-terminated polypropylene oxide into allyl groups. Unreacted allyl chloride was then removed by vacuum evaporation. 300 parts by weight of n-hexane and 300 parts by weight of water were added to 100 parts by weight of the allyl group-terminated unpurified polypropylene oxide thus obtained, the obtained mixture was stirred, and then water was removed by centrifugation. After that, 300 parts by weight of water was further added to the obtained hexane solution with stirring, water was removed again by centrifugation and successively, hexane was removed by vacuum evaporation in order to obtain an allyl group-terminated bifunctional polypropylene oxide with a number average molecular weight of about 25,500 (hereinafter, referred to as "polymer P").

Using 150 ppm of an isopropanol solution of a platinum-vinylsiloxane complex with 3% by weight of platinum content as a catalyst, 100 parts by weight of the polymer P was reacted with 0.93 parts by weight of methyldimethoxysilane at 90° C. for 5 hours to obtain a methyldimethoxysilyl group-terminated polyoxypropylene polymer (A-1). Further, the ratio (defined as S) of the peak integration value of the terminal allyl group ($—CH_2—CH=CH_2$) (near 5.1 ppm) relative to the peak integration value of 1,000 of the methyl group (near 1.2 ppm) of the polypropylene oxide main chain of the bifunctional polymer P and the ratio (defined as S') of the peak integration value of the methylene group ($—CH_2—CH_2—CH_2—Si(CH_3)(OCH_3)_2$) (near 0.6 ppm) bonded to the silicon atom of the terminal silyl group relative to the peak integration value of 1,000 of the methyl group (near 1.2 ppm) of the polypropylene oxide main chain of the silyl group-terminated polypropylene oxide (A-1) after hydrosilylation reaction were determined by $^1$H-NMR measurement (measured by using JNM-LA 400 manufactured by Nippon Electric Co., Ltd., and in $CDCl_3$ solvent). Then, the silyl group introduction ratio (S'/S)×2 (this number accounts for "bifunctional") was determined to find that 1.3 terminal methyldimethoxysilyl groups were introduced per one molecule on average.

SYNTHESIS EXAMPLE 2

Using 150 ppm of an isopropanol solution of a platinum-vinylsiloxane complex with 3% by weight of platinum content as a catalyst, 100 parts by weight of the polymer P was reacted with 1.1 parts by weight of trimethoxysilane at 90° C. for 5 hours to obtain a trimethoxysilyl group-terminated polyoxypropylene polymer (A-2). Then, the silyl group introduction ratio (S'/S)×2 (this number accounts for "bifunctional") was determined, in the same manner as in Synthesis Example 1 by $^1$H-NMR measurement (measured by using JNM-LA 400 manufactured by Nippon Electric Co., Ltd., and in $CDCl_3$ solvent), to find that 1.3 terminal trimethoxysilyl groups were introduced per one molecule on average.

SYNTHESIS EXAMPLE 3

Propylene oxide was polymerized by using polyoxypropylene triol with a molecular weight of about 3,000 as an initiator and a zinc hexacyanocobaltate-glyme complex catalyst in order to obtain a polypropylene oxide with a number average molecular weight of about 26,000 (measured by using HLC-8120 GPC manufactured by Tosoh Corporation as a solution transporting system; TSK-GEL H column manufactured by Tosoh Corporation as a column; and THF as a solvent: the molecular weight was determined on the basis of conversion into polystyrene). Next, a NaOMe methanol solution of which the NaOMe content was 1.2 equivalent weights relative to the hydroxyl groups of the hydroxyl group-terminated polypropylene oxide was added followed by removal of methanol, and then allyl chloride was added thereto in order to convert the terminal hydroxyl groups of the hydroxyl group-terminated polypropylene oxide into allyl groups. Unreacted allyl chloride was then removed by vacuum evaporation. 300 parts by weight of n-hexane and 300 parts by weight of water were added to 100 parts by weight of the allyl-terminated unpurified polypropylene oxide thus obtained, the obtained mixture was stirred, and then water was removed by centrifugation. After that, 300 parts by weight of water was further added to the obtained hexane solution with stirring, water was removed again by centrifugation and successively, hexane was removed by vacuum evaporation in order to obtain an allyl group-terminated trifunctional polypropylene oxide with a number average molecular weight of about 26,000. Using 150 ppm of an isopropanol solution of a platinum-vinylsiloxane complex with 3% by weight of platinum content as a catalyst, 100 parts by weight of the allyl group-terminated trifunctional polypropylene oxide thus obtained was reacted with 1.4 parts by weight of methyldimethoxysilane at 90° C. for 5 hours to obtain a methyldimethoxysilyl group-terminated polyoxypropylene polymer (A-3). Then, the silyl group introduction ratio (S'/S)×3 (this number accounts for "trifunctional") was determined by $^1$H-NMR measurement (measured by using JNM-LA 400 manufactured by Nippon Electric Co., Ltd., and in CDCl$_3$ solvent), as in Synthesis Example 1, to find that 2.4 terminal methyldimethoxysilyl groups were introduced per one molecule on average.

EXAMPLES 1 AND 2 AND COMPARATIVE EXAMPLE 1

Using a three-roll paint mill, 100 parts by weight of the methyldimethoxysilyl group-terminated polyoxypropylene polymer (A-1) obtained in Synthesis Example 1 was thoroughly kneaded with 50 parts by weight of surface-treated colloidal calcium carbonate (product of Shiraishi Kogyo: Hakuenka CCR) and 50 parts by weight of ground calcium carbonate (product of Shiraishi Calcium: Whiton SB). The mixture was dehydrated under vacuum at 120° C. for 2 hours for use as a chief material. To the chief material were added, under constant temperature and constant humidity conditions (25° C., 50%), 3 parts by weight of γ-aminopropyltrimethoxysilane (product of Dow Corning Toray: A-1110) as an adhesion promoter and an amine compound specified in Table 1 as a silanol condensation catalyst in an amount (parts by weight) specified in Table 1, and the mixture was kneaded using a spatula for two minutes. After thorough deaeration of the compound, there was obtained a curable composition.

(Skinning Time Measurement)

Samples were prepared by applying each curable composition obtained onto a polyethylene sheet and spreading the same to a thickness of 3 mm, followed by surface smoothening. The time of finishing of sample preparation was regarded as the curing start time, and the skinning time was measured as the time required for the curable composition, touched on the surface with a spatula, to no longer adhere to the spatula. The results thus obtained are shown in Table 1.

(Bleedout Evaluation)

Each sample after the above-mentioned skinning time measurement was allowed to stand under constant-temperature and constant-humidity conditions of 23° C. and 50% for 24 hours and then the surface thereof was touched with a finger. When there was no liquid compound that had bled out on the sample surface, hence the finger was not stained with any such compound, the sample surface was evaluated as "no" bleedout and, when the finger was stained with such a liquid compound(s), the surface was evaluated as bleedout "yes".

Further, the state, at 23° C., of each amine compound used was observed by the eye and judged as "solid" or "liquid". The results are shown in Table 1.

TABLE 1

|  |  |  | Example | | Comparative Example |
|---|---|---|---|---|---|
|  |  |  | 1 | 2 | 1 |
| Chief material | Organic polymer (A) | A-1 | 100 | 100 | 100 |
|  | Calcium carbonate | Hakuenka CCR | 50 | 50 | 50 |
|  |  | Whiton SB | 50 | 50 | 50 |
| Adhesion promoter (C) |  | A-1110[1] | 3 | 3 | 3 |
|  | Amidine compound or guanidine compound (B) | 1,5,7-Triazabicyclo[4.4.0]dec-5-ene solution[2] | 3 |  |  |
|  |  | 1-n-Butylbiguanide solution[3] |  | 4 |  |
| Amine compound |  | DBU[4] |  |  | 2 |
| State of amine compound at 23° C. |  |  | Solid | Solid | Liquid |
| Results |  | Bleedout | No | No | Yes |
|  |  | Curability (skinning time) | 14 min | 5 hrs | ≧24 hrs |

[1]A-1110: γ-aminopropyltrimethoxysilane
[2]1,5,7-Triazabicyclo[4.4.0]dec-5-ene solution: 67% solution of 1,5,7-Triazabicyclo[4.4.0]dec-5-ene in methanol
[3]1-n-Butylbiguanide solution: 50% solution of 1-n-butylbiguanide in methanol
[4]DBU: 1,8-diazabicyclo[5.4.0]undec-7-ene As shown in Table 1, when 1,5,7-triazabicyclo[4.4.0]dec-5-ene or 1-n-butylbiguanide, which occurs as a solid at 23° C. (having a melting point not lower than 23° C.), was used as the silanol condensation catalyst, no bleedout was found and the curability was good in each case (Examples 1 and 2). On the contrary, when DBU, which occurs as a liquid at 23° C. (having a melting point lower than 23° C.), was used, bleeding out occurred and the curability also poor

COMPARATIVE EXAMPLE 1

EXAMPLES 3 AND 4 AND COMPARATIVE EXAMPLES 2 and 3

Using a three-roll paint mill, 100 parts by weight of the trimethoxysilyl group-terminated polyoxypropylene polymer (A-2) obtained in Synthesis Example 2 was thoroughly kneaded with 120 parts by weight of surface-treated colloidal calcium carbonate (product of Shiraishi Kogyo: Hakuenka CCR), 20 parts by weight of titanium oxide (product of Ishihara Sangyo: Tipaque R-820), 55 parts by weight of a plasticizer (product of Kyowa Hakko Kogyo: DIDP), 2 parts by weight of a thixotropic agent (product of Kusumoto Chemicals: Disparlon #6500), 1 part by weight of an ultraviolet absorber (product of Sumitomo Chemical: Sumisorb 400), 1 part by weight of a light stabilizer (product of Sankyo Lifetech: Sanol LS 770) and 1 part by weight of an antioxidant (product of YSK, Inc.: Yunox KC). The mixture was dehydrated under vacuum at 120° C. for 2 hours for use as a chief material. To the chief material were added, under constant temperature and constant humidity conditions (23° C., 50%), 5 parts by weight of γ-aminopropyltrimethoxysilane (product of Dow Corning Toray: A-1110) and 3 parts by weight of γ-glycidoxypropyltrimethoxysilane (product of Dow Corning Toray: A-187) each as an adhesion promoter and an amine compound specified in Table 2 as a silanol condensation catalyst in an amount (parts by weight) specified in Table 2, and skinning time measurement and bleedout evaluation were carried out in the same manner as in Example 1. Further, the state, at 23° C., of each amine compound used was observed by the eye and judged as "solid" or "liquid". The results are shown in Table 2.

Example 2). When DBU, which occurs as a liquid at 23° C., was used, bleeding out occurred and the curability was also inferior

COMPARATIVE EXAMPLE 3

EXAMPLES 5 TO 7 AND COMPARATIVE EXAMPLES 4 TO 8

To 100 parts by weight of the trimethoxysilyl group-terminated polyoxypropylene polymer (A-2) obtained in Synthesis Example 2 were added 50 parts by weight of surface-treated colloidal calcium carbonate (product of Shiraishi Kogyo, Hakuenka CCR) and 50 parts by weight of ground calcium carbonate (product of Shiraishi Calcium, Whiton SB), and a chief material was prepared in the same manner as mentioned above. To the chief material were added 3 parts by weight of γ-aminopropyltrimethoxysilane (product of Dow Corning Toray, A-1110) as an adhesiveness imparting agent and an amount (in parts by weight) specified in Table 3 of each amine compound specified in Table 3 as a silanol condensation catalyst, and the resulting composition was subjected to skinning time measurement and bleedout evaluation in the same manner as in Example 1.

Further, each compound was brought into close contact with an adherend substrate (glass, stainless steel or vinyl chloride resin) to attain an approximate size of 3.0 cmin length×1.5 cm in width×1.0 cm in thickness and cured under constant-temperature and constant-humidity conditions of 23° C. and 50% for 7 days, followed by adhesiveness evaluation by 90-degree hand peel testing. The adhesiveness evaluation was made in terms of mode of failure: when the cohesion failure percentage was not lower than 80% and up to

TABLE 2

|  |  |  | Example | | Comparative Example | |
|---|---|---|---|---|---|---|
|  |  |  | 3 | 4 | 2 | 3 |
| Chief material | Organic polymer (A) | A-2 | 100 | 100 | 100 | 100 |
|  | Calcium carbonate | Hakuenka CCR | 120 | 120 | 120 | 120 |
|  | Titanium oxide | Tipaque R-820 | 20 | 20 | 20 | 20 |
|  | Plasticizer | DIDP | 55 | 55 | 55 | 55 |
|  | Thixotropic agent | Disparlon #6500 | 2 | 2 | 2 | 2 |
|  | Ultraviolet absorber | Sumisorb 400 | 1 | 1 | 1 | 1 |
|  | Light stabilizer | Sanol LS770 | 1 | 1 | 1 | 1 |
|  | Antioxidant | Yunox KC | 1 | 1 | 1 | 1 |
| Adhesion promoter (C) |  | A-1110[1] | 5 | 5 | 5 | 5 |
|  |  | A-187[2] | 3 | 3 | 3 | 3 |
|  | Amidine compound or guanidine compound (B) | 1-n-Butylguanidine solution[3] | 6 |  |  |  |
|  |  | 1-n-Butylbiguanide solution[4] |  | 6 |  |  |
| Amine compound |  | 1-(o-Tolyl)biguanide |  |  | 4 |  |
|  |  | DBU[5] |  |  |  | 5 |
| State of amine compound at 23° C. |  |  | Solid | Solid | Solid | Liquid |
| Results |  | Bleedout | No | No | No | Yes |
|  |  | Curability (skinning time) | 18 min | 20 min | 67 min | 27 min |

[1]A-1110: γ-aminopropyltrimethoxysilane
[2]A-187: γ-glycidoxypropyltrimethoxysilane
[3]1-n-Butylguanidine solution: 50% solution of 1-n-butylguanidine in methanol
[4]1-n-Butylbiguanide solution: 33% solution of 1-n-butylbiguanide in methanol
[5]DBU: 1,8-diazabicyclo[5.4.0]undec-7-ene As shown in Table 2, when 1-n-butylguanidine or 1-n-butylbiguanide, which occurs as a solid at 23° C., was used as the silanol condensation catalyst, no bleedout was found and the curability was good in each case (Examples 3 and 4). On the contrary, when 1-(o-tolyl)biguanide having an aryl substituent was used, the curability was inferior (Comparative 100%, the adhesiveness was evaluated as "Excellent", when that percentage was not lower than 20% but lower than 80%, as "Good" and, when that percentage was lower than 20% to 0%, as "Poor". Further, the state, at 23° C., of each amine compound used was observed by the eye and judged as "solid" or "liquid". The results are shown in Table 3.

TABLE 3

|  |  |  | Example | | | Comparative Example | | | | |
|---|---|---|---|---|---|---|---|---|---|---|
|  |  |  | 5 | 6 | 7 | 4 | 5 | 6 | 7 | 8 |
| Chief material | Organic polymer (A) | A-2 | 100 | 100 | 100 | 100 | 100 | 100 | 100 | 100 |
|  | Calcium carbonate | Hakuenka CCR | 50 | 50 | 50 | 50 | 50 | 50 | 50 | 50 |
|  |  | Whiton SB | 50 | 50 | 50 | 50 | 50 | 50 | 50 | 50 |
| Adhesion promoter (C) |  | A-1110[1] | 3 | 3 | 3 | 3 | 3 | 3 | 3 | 3 |
|  | Amidine compound or guanidine compound (B) | 1,5,7-Triazabicyclo[4.4.0]dec-5-ene solution[2] | 0.5 |  |  |  |  |  |  |  |
|  |  | 1-n-Butylguanidine solution[3] |  | 4 |  |  |  |  |  |  |
|  |  | 1-n-Butylbiguanide solution[4] |  |  | 4 |  |  |  |  |  |
| Amine compound |  | 1-(o-Tolyl)biguanide |  |  |  | 3 |  |  |  |  |
|  |  | DBU[5] |  |  |  |  | 2 |  |  |  |
|  |  | DBN[6] |  |  |  |  |  | 2 |  |  |
|  |  | Diethylenetriamine |  |  |  |  |  |  | 4 |  |
|  |  | Triethylamine |  |  |  |  |  |  |  | 4 |
| State of amine compound at 23° C. | | | Solid | Solid | Solid | Solid | Liquid | Liquid | Liquid | Liquid |
| Results | Bleedout | | No | No | No | No | Yes | Yes | Yes | Yes |
|  | Curability (skinning time) | | 14 min | 5 min | 8 min | 35 min | 28 min | 43 min | 55 min | ≧24 hrs |
|  | Adhesiveness (90° hand peel) | Glass | Excellent | Excellent | Excellent | Excellent | Excellent | Excellent | Good | — |
|  |  | Stainless | Excellent | Excellent | Excellent | Excellent | Poor | Poor | Poor | — |
|  |  | Vinyl chloride | Excellent | Excellent | Excellent | Excellent | Poor | Poor | Poor | — |

[1]A-1110: γ-aminopropyltrimethoxysilane
[2]1,5,7-Triazabicyclo[4.4.0]dec-5-ene solution: 67% solution of 1,5,7-Triazabicyclo[4.4.0]dec-5-ene in methanol
[3]1-n-Butylguanidine solution: 50% solution of 1-n-butylguanidine in methanol
[4]1-n-Butylbiguanide solution: 50% solution of 1-n-butylbiguanide in methanol
[5]DBU: 1,8-diazabicyclo[5.4.0]undec-7-ene
[6]DBN: 1,5-diazabicyclo[4.3.0]non-5-ene As shown in Table 3, when 1,5,7-triazabicyclo[4.4.0]dec-5-ene, 1-n-butylguanidine or 1-n-butylbiguanide, which occurs as a solid at 23° C., was used as the silanol condensation catalyst, no bleedout was found and the curability and adhesiveness were good in each case (Examples 5 to 7). On the contrary, when 1-(o-tolyl)biguanide having an aryl substituent was used, the curability was inferior (Comparative Example 4). When DBU, DBN, diethylenetriamine, or triethylamine, which occurs as a liquid at 23° C., was used, bleeding out occurred and the curability and adhesiveness were also inferior (Comparative Examples 5 to 8).

EXAMPLE 8 AND COMPARATIVE EXAMPLE 9

Ground calcium carbonate (product of Shiraishi Calcium, Whiton SB; 75 parts by weight) and 75 parts by weight of ground calcium carbonate (product of Bihoku Funka Kogyo, PO320B10), 25 parts by weight of talc (product of Fuji Talc Industrial, PKP-80), 25 parts by weight of balloons (product of Taiheiyo Cement, SL-150) and 5 parts by weight of a plasticizer (product of Mitsui Takeda Chemicals, Actocol 21-56K) were weighed and added to 100 parts by weight of the methyldimethoxysilyl group-terminated polyoxypropylene polymer (A-3) obtained in Synthesis Example 3, and the resulting mixture was thoroughly kneaded and then passed through a three-roll paint mill for dispersion. Thereafter, the mixture was dehydrated under vacuum at 120° C. for 2 hours and, after cooling to 50° C. or below, two parts by weight of vinyltrimethoxysilane (product of Dow Corning Toray, A-171) as a dehydrating agent, 1,5 parts by weight of N-β-(aminoethyl)-γ-aminopropyltrimethoxysilane (product of Dow Corning Toray, trademark: A-1120) as an adhesiveness imparting agent, 25 parts by weight of methanol as an organic solvent and an amount (in parts by weight) specified in Table 4 of each amine compound specified in Table 4 as a silanol condensation catalyst were respectively added to the mixture, and the whole mixture was kneaded in the substantial absence of moisture and then packed in a moisture-proof container. Thus was obtained a one-pack curable composition.

The above curable composition was spread over a polyethylene sheet to a thickness of about 3 mm and the surface was smoothened under constant-temperature and constant-humidity conditions of 23° C. and 50%. This point of time was regarded as the time of the start of curing and the skinning time, namely the time required for the surface of the compound to become no longer sticky when touched with a spatula, was measured. Further, the adhesion strength was measured in terms of 90-degree peel strength according to JIS A 5536:2003. The curable composition was applied onto a slate board using a notched trowel and, after the lapse of each respective open time, a Tajima, Inc. vinyl floor sheet, AC Floor 28 (corresponding to JIS A 5705 vinyl floor sheet DO) was put on the curable composition. After 48 hours of curing under constant-temperature and constant-humidity conditions of 23° C. and 50% for 48 hours, the whole was subjected to peel strength measurement. The results are shown in Table 4.

TABLE 4

|  |  | Example 8 | Comparative Example 9 |
|---|---|---|---|
| Organic polymer (A) | A-3 | 100 | 100 |
| Calcium carbonate | Whiton SB | 75 | 75 |
|  | PO320B10 | 75 | 75 |
| Talc | PKP-80 | 25 | 25 |
| Balloons | SL-150 | 25 | 25 |
| Plasticizer | Actocol 21-56K | 5 | 5 |
| Dehydrating agent | A-171[1] | 2 | 2 |
| Adhesion promoter (C) | A-1120[2] | 1.5 | 1.5 |
| Amidine compound or guanidine compound (B) | 1-n-Butylbiguanide solution[3] | 2 |  |
| Amine compound | 1-(o-Tolyl)biguanide |  | 2.5 |
| Organic solvent | Methanol | 25 | 25 |

TABLE 4-continued

| | | Example 8 | Comparative Example 9 |
|---|---|---|---|
| Curability (skinning time) | | 30 min | 5 hrs |
| 90-Degree peel strength (N/25 mm) | Open time 10 min. | 30 | 15 |
| | Open time 20 min. | 20 | 17 |
| | Open time 30 min. | 15 | 14 |
| | Open time 40 min. | 8 | 12 |

(1)A-171: vinyltrimethoxysilane
(2)A-1120: N-β-(aminoethyl)-γ-aminopropyltrimethoxysilane
(3)1-n-Butylbiguanide solution: 33% solution of 1-n-butylbiguanide in methanol As shown in Table 4, when 1-n-butylbiguanide was used as the silanol condensation catalyst, the curability and the adhesion strength were good in each case (Example 8). On the contrary, when 1-(o-tolyl) biguanide having an aryl substituent was used, the curability and the adhesion strength were inferior

COMPARATIVE EXAMPLE 9

The amine components shown in Tables 1 to 4 were as follows.
1,5,7-Triazabicyclo[4.4.0]dec-5-ene solution: A 67% solution of 1,5,7-triazabicyclo[4.4.0]dec-5-ene (product of Sigma-Aldrich Corp.) in methanol was prepared and used.
1-n-Butylguanidine solution: Equimolar amounts of 2-methylisourea hydrochloride (product of Lancaster) and butylamine (product of Wako Pure Chemical Industries) were heated under reflux in methanol as a solvent for 2 hours and the resulting mixture was neutralized with a methanol solution of sodium methoxide to give 1-n-butylguanidine. A 50% methanol solution of this 1-n-butylguanidine was prepared and used.
DBU: 1,8-diazabicyclo[5.4.0]dec-5-ene (product of San-Apro)
1-Butylbiguanide solution: 1-n-Butylbiguanide hydrochloride (product of Wako Pure Chemical Industries) was neutralized with an aqueous solution of sodium hydroxide to give 1-n-butylbiguanide. A 50% methanol solution of this 1-n-butylbiguanide was prepared and use.
1-(o-tolyl)biguanide (product of Tokyo Kasei Kogyo)
DBN: 1,5-Diazabicyclo[4.3.0]non-5-ene (product of San-Apro)
Diethylenetriamine (product of Tokyo Kasei Kogyo)
Triethylamine (product of Tokyo Kasei Kogyo)

INDUSTRIAL APPLICABILITY

The curable composition of the invention is usable for pressure sensitive adhesives, sealants for buildings and constructions, ships, automobiles and roads etc., adhesives, framing agents, materials for vibration absorption, materials for vibration suppression, materials for noise reduction, foamed materials, paints, spraying materials and the like. The curable composition of the invention is more preferable to be used as sealants or adhesives among them since the cured product obtained by curing the composition is excellent in flexibility and adhesion.

Further, the curable composition is usable for various uses, for example electric and electronic parts such as sealants for rear faces of solar cells; insulating materials such as insulating coating materials for electric wires and cables; elastic adhesives, contact adhesives, spraying sealants, crack repairing materials, adhesives for tiles, powdery coating materials, casting materials, rubber materials for medical use, pressure sensitive adhesives for medical use, sealants for medical appliances, packaging materials for food, joint sealants for exterior materials such as a siding board, coating materials, primers, conductive materials for shielding electromagnetic wave, heat conductive materials, hot melt materials, electric and electronic potting agents, films, gaskets, various kinds of molding materials, rustproof and waterproof sealants for end faces (cut sections) of net glass or laminated glass, liquid sealants used in automobile parts, electric parts, various kinds of machine parts and the like, and the like. Further, since the curable composition can be closely stuck to a wide range of substrates such as glass, ceramics, wood, metals, and resin molded products by itself or with assist of a primer, it is also usable as various types of hermetically sealing compositions and adhesive compositions. The curable composition of the invention may be used as adhesives for interior panels, adhesives for exterior panels, adhesives for tiles, adhesives for stone material lining, adhesives for ceiling finishing, adhesives for floor finishing, adhesives for wall finishing, adhesives for vehicle panels, adhesives for assembly of electric apparatus/electronic apparatus/precision apparatus, sealants for direct grading, sealants for pair glass, sealants for SSG process, sealants for working joints of buildings and constructions, and the like.

The invention claimed is:
1. A non-organotin-based curable composition which comprises:
(A) an organic polymer having a silicon-containing group capable of crosslinking by siloxane bond formation, wherein the (A) component organic polymer is at least one polymer selected from the group consisting of polyoxyalkylene polymers, saturated hydrocarbon polymers and (meth)acrylate ester polymers,
(B) a biguanide compound represented by the general formula (4):

$$R^{10}N=C(NR^{11}{}_2)-NR^{12}-C(=NR^{13})-NR^{14}{}_2 \quad (4)$$

(wherein $R^{10}$, the two $R^{11}$ moieties, $R^{12}$, $R^{13}$ and the two $R^{14}$ moieties each independently is a hydrogen atom or a non-aryl monovalent organic group; any two or more of $R^{10}$, the two $R^{11}$ moieties, $R^{12}$, $R^{13}$ and the two $R^{14}$ moieties may be bound together to form a ring structure) and/or the general formula (5):

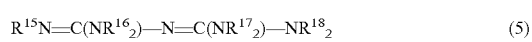

$$R^{15}N=C(NR^{16}{}_2)-N=C(NR^{17}{}_2)-NR^{18}{}_2 \quad (5)$$

(wherein $R^{15}$, the two $R^{16}$ moieties, the two $R^{17}$ moieties, and the two $R^{18}$ moieties each independently is a hydrogen atom or a non-aryl monovalent organic group; any two or more of $R^{15}$, the two $R^{16}$ moieties, the two $R^{17}$ moieties and the two $R^{18}$ moieties may be bound together to form a ring structure).
2. The non-organotin-based curable composition according to claim 1
wherein the guanidine compound is a guanidine compound represented by the general formula (2) wherein any two or more of $R^4$, the two $R^5$ moieties and the two $R^6$ moieties are bound together to form a ring structure.

3. The non-organotin-based curable composition according to claim 1,
wherein the guanidine compound represented by the general formula (2) is a cyclic guanidine compound represented by the general formula (6):

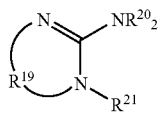

(6)

(wherein $R^{19}$ is a divalent organic group and the two $R^{20}$ moieties and $R^{21}$ each independently is a hydrogen atom or a non-aryl monovalent organic group; any two of the two $R^{20}$ moieties and $R^{21}$ may be bound together to form a ring structure).

4. The non-organotin-based curable composition according to claim 1,
wherein the polyoxyalkylene polymer is a polyoxypropylene polymer.

5. The non-organotin-based curable composition according to claim 1,
wherein the main chain skeleton of the polyoxyalkylene polymer is composed of hydrogen atoms, carbon atoms and oxygen atoms alone.

6. The non-organotin-based curable composition according to claim 1,
which comprises the component (B) in a proportion of 0.001 to 20 parts by weight per 100 parts by weight of the component (A).

7. The non-organotin-based curable composition according to claim 1,
which further comprises an adhesion promoter (C) in a proportion of 0.01 to 20 parts by weight per 100 parts by weight of the component (A).

8. A sealing composition
which comprises the non-organotin-based curable composition according to claim 1.

9. An adhesive composition which comprises the non-organotin-based curable composition according to claim 1.

* * * * *